(12) United States Patent
Kurt

(10) Patent No.: US 7,089,720 B2
(45) Date of Patent: Aug. 15, 2006

(54) AUTOMATIC SYSTEM-BASED ANIMAL TRAINING DEVICE

(76) Inventor: Mehmet Kurt, Sarisakal Fabrikasi, Sarisakal, Ceyhan, 01960 Adana (TR)

( * ) Notice: Subject to any disclaimer, the term of this patent is extended or adjusted under 35 U.S.C. 154(b) by 0 days.

(21) Appl. No.: 10/475,046

(22) PCT Filed: Apr. 17, 2002

(86) PCT No.: PCT/TR02/00016

§ 371 (c)(1),
(2), (4) Date: Jul. 2, 2004

(87) PCT Pub. No.: WO02/082892

PCT Pub. Date: Oct. 24, 2002

(65) Prior Publication Data

US 2004/0244341 A1    Dec. 9, 2004

(30) Foreign Application Priority Data

| | | | |
|---|---|---|---|
| Apr. 17, 2001 | (TR) | | 2001/01003 |
| Jul. 11, 2001 | (TR) | | 2001/01994 |
| Nov. 26, 2001 | (TR) | | 2001/03372 |
| Mar. 11, 2002 | (TR) | | a 2002 00639 |

(51) Int. Cl.
*A01K 15/02* (2006.01)
*B68B 1/00* (2006.01)

(52) U.S. Cl. .............. 54/71; 119/422; 119/702
(58) Field of Classification Search ............... 54/71; 119/422, 702–704; 482/68
See application file for complete search history.

(56) References Cited

U.S. PATENT DOCUMENTS

|  |  |  |  |  |
|---|---|---|---|---|
| 877,504 A | * | 1/1908 | Hoover | 119/701 |
| 3,099,248 A | * | 7/1963 | Giles et al. | 119/712 |
| 3,349,751 A | * | 10/1967 | Frostad | 119/703 |
| 4,130,091 A | * | 12/1978 | Knudson | 119/701 |
| 4,138,966 A | * | 2/1979 | Hesnault | 119/701 |
| 4,266,508 A | | 5/1981 | McNulty | |
| 4,619,222 A | | 10/1986 | Sundberg et al. | |
| 5,070,816 A | * | 12/1991 | Wehrell | 119/702 |
| 5,138,550 A | * | 8/1992 | Abraham et al. | 340/573.7 |
| 5,186,125 A | * | 2/1993 | Halyung | 119/712 |
| 6,817,318 B1 | * | 11/2004 | Kurt | 119/712 |

FOREIGN PATENT DOCUMENTS

| | | |
|---|---|---|
| DE | 198 34 257 | 2/2000 |
| WO | WO 01/97606 | 9/2000 |

* cited by examiner

*Primary Examiner*—Michael J. Carone
*Assistant Examiner*—Bret Hayes
(74) *Attorney, Agent, or Firm*—Kenyon & Kenyon LLP

(57) ABSTRACT

An automated animal-training system is provided, which includes an enclosure device for the animal, an arrangement for adjustably fixing the location of the animal within the enclosure device, and an actuation mechanism for moving the automated animal-training system. In order to simulate real racing situations for the animals, the arrangement for adjustably fixing the location of the animal within the enclosure device is controlled by one or more motors movable on sliding rails. Furthermore, a mechanism is provided for suspending the animal in the training device in case the animal trips.

67 Claims, 23 Drawing Sheets

AUTOMATIC SYSTEM-BASED ANIMAL TRAINING DEVICE

FIELD OF THE INVENTION

This invention relates to an automatic animal training system for physical performance improvement and simulation means for the animals participating in racing.

BACKGROUND INFORMATION

Among the features affecting the performances of racehorses, camels and similar animals throughout their active life are taken into consideration, it is scientifically accepted that origin, nutrition, caring, training factors have importance with respect to other factors. The origin of animals is a distinctive feature, since it is determined by nature.

Unlike the origin feature, the other of the above-mentioned factors can be exploited by various methods, programs and devices enabling exclusive manner of approach to the animals.

Published international application WO 01/97606 disclosing complete automatic system-based training system for animals, especially those participating in races, describes a training device, the lateral and rear sides of which are surrounded by a flexible material and the front side of which is covered by a locking mechanism, and a tractor is placed in front or rear side of the training device.

In this previous application WO 01/97606, it has been stated that the training device is guided by wheels embodied on the lateral sides of the device in such a way that the wheels are disposed in rails and the device is moved accordingly, or alternatively, the device is guided by some means attached to a line which is located on upper side of the device.

In addition to these features, the previous application WO 01/97606 discloses orientation pattern of the training devices, namely these devices can be employed individually around racecourses, or alternatively these devices can be employed as a group.

The previous application WO 01/97606 presents a unique approach to complete automatic-based animal training system and brings about many advantages. The present animal training processes are based on human intervention, in other words animal training programs involve human-controlled manner. This human-controlled training approach leads the animals to become physically disabled during the training process. The annual rate of the horses becoming disabled is so huge that approximately 90% colts which would potentially become racehorse never become racehorses.

The reason behind the high injury rate of the race animals is mainly due to lack of harmony between the trainer and the animal. During the training the animal is forced to behave in the manner that trainers demand, and this lack of harmony leads to the animal being physically disabled.

Furthermore, taking into consideration human intervention for the training of animals participating in long-distance races, particularly those encountered in Arabic countries, many disadvantages are confronted. This is indeed the case when long-distance and accordingly long-term races are of concern, and animal injury problem arises since the eccentrical position of the rider on the animal leads to the loss of animal stability during the training or race time.

Although some other training facilities are known from the state of the art, e.g., published U.S. Pat. No. 4,266,508 and U.S. Pat. No. 4,619,222, none of these patents suggests a complete automatic training system for facilitating concrete simulation with respect to the racing conditions.

For example, U.S. Pat. No. 4,266,508 discloses a frame in which animals are introduced. This frame is pulled by a tractor means (self-powered vehicle) only from the front side of the frame and wheels are placed at the rear side of the frame.

U.S. Pat. No. 4,266,508 is the first proposal serving an animal surrounded training device and bears some significant advantages. Nevertheless, pulling the frame from only the front side by a vehicle, which is non-integrated to the frame, presents considerable disadvantages. One disadvantage results from the placement of the vehicle in the front side of the frame, since animals become easily frightened by the existence of such a vehicle in front of running direction of the animals. This would lead to insufficient training practice of the animals accordingly. Besides, since the tractor means (vehicle) is not connected to the frame directly, in other words the wheels are connected to the frame by virtue of supplementary axles, changing the direction of the frame would be delayed due to inaccurate direction control mechanism. These direction-changing delays would again lead to insufficient training practice of the animals.

As for U.S. Pat. No. 4,619,222, this patent discloses mobile means connected from one end to the head of the animal and from other end to some guiding means by virtue of wheels. As it is seen from U.S. Pat. No. 4,619,222, neither confining means surrounding the animal to be trained nor tractor means are employed in this system. In other words, in case of irritation, it is obvious that the animal can hurt itself due to lack of confining means.

Other animal training facilities are those so-called manege, running bands or tracks. These facilities are actually utilized for tempering animals, particularly horses, and including abstract embodiments i.e. real race conditions are not met due to lack of concrete simulators in these facilities.

In addition to training process for animals, the previous application WO 01/97606 has also suggested monitoring means for evaluating physiological characteristics in real-time performance of the animals being trained. Data acquired from these monitoring means are evaluated in a unit connected to the training device.

With the suggested technical features, the previous application WO 01/97606 aimed to minimize human intervention in animal training processes.

However, the features suggested in the previous application WO 01/97606 have some deficiencies, and the instant invention is provided for overcoming these deficiencies.

For example, in the previous application WO 01/97606 the locking mechanism placed front side of the training device serves to confine the horse in the device, however at the same time the locking mechanism falls outside of the view angle of the horse. This deficiency leads the horse to lift its head upwards and lower its head downwards simultaneously during training, consequently decreasing performance of the animal.

Another deficiency experienced during training is referred to constructional disadvantage of the training device. During training, the horse may become nervous and kick the lateral sides of the device or the legs may go outside of the device. As a result the horse may hurt its legs.

Another deficiency as to the training device in the previous application WO 01/97606 is the lack of simulation means with respect to racing conditions. Namely, the deficiency is the lack of mass of the jockey or the trainer during training as encountered in real case.

Another deficiency is associated with the securing means for the animals being trained. Basically, disabling of the horse in the device would not be prevented when an external effect takes place. For example, there is no mechanical component securing the animal in case of tottering or falling down during training.

In the previous application WO 01/97606, "guiding" of the device by means of wheels from lateral sides thereof, and also "guiding" the device from the upper side thereof through the racecourse, may lead to notion that the actuation means of the devices are limited. In the event of individual or multiple utilization of the training devices, it is obvious that some alternative actuation means are strictly required.

Another important deficiency of the previous application WO 01/97606 is lack of a pre-training facilities. This is significant, since most of the time the animal which will be subjected to an automatic-based training program by employing a device covered by confinement means will resist this program.

Furthermore, the prior art fails to disclose an embodiment rendering a smooth running ground for the animals. This aspect should be taken into consideration since the ground of racecourse is generally coated by sand.

In the previous application WO 01/97606 it has been disclosed many embodiments for achieving complete automatic animal training facility. However, since in real-time races the animals are managed by a human, simulation means have been lacking in the previous application WO 01/97606. Simulation means must be provided in the automatic training facility for a smooth transition between the training program and real-time racing conditions. Particularly, in the previous application WO 01/97606, lack of rider's commands to the animal does not reflect the real-time racing conditions.

In real-time racing conditions, bit and bridle should be simultaneously employed by the rider for enabling a complete control of the animal so that the race is won by the animal. Capability of controlling the animal is one of the determining aspects for achieving the best results.

Another feature that should be controlled during racing is the saddle, indeed the failure of the rider to sit properly on the animal during race would disturb the animal and present an obstacle for winning the race.

Furthermore, another deficiency that has not been disclosed by the previous application WO 01/97606 is the inability to simulate displacement of the lateral coverages. This deficiency would cause the inability of adjusting the position of the animal in the training device and result in the incapacity of the animal for the real-time adaptation.

The object of the present invention is to provide a pre-training facility for orientation of racehorses or similar animals being trained by an automatic training system.

Another object of the present application is to provide alternative means for moving automatic training devices.

Further object of the present application is to provide training stabilization of racehorses or similar animals during training and to provide simulation means with respect to real-time racing conditions.

Another object of the present application is to provide monitoring of performances of the animals by real-time evaluation of bio-mechanical and physiological features of the animals.

Yet another object of the present application is to provide a complete adaptation of the animal to the racing conditions.

Another object of the present invention is to provide an integrated animal training device, particularly integration of coverages surrounding the animal with tractor means.

SUMMARY

The instant invention provides: a pre-training unit for an automatic training facility for animals, the automatic training device, alternative embodiments for actuating the automatic training device, and integrated animal training device, i.e., integration of coverages surrounding the animal and control unit comprising self-powered motor and direction control means.

The components comprising the pre-training unit are; convex structures arranged predetermined spaces with respect to each other around a running track, and these convex structures are fixed to the ground; static structures comprising rails around the running track and wheels disposed in these rails; and dynamic structures moving by the animal subjected to pre-training program. Furthermore, in order to enhance the extent of adaptation of the animal to the essential automatic training program, the animal is in interaction with the rails placed on top section of the convex structures by connection means placed on the breast section of the animal body.

The animal, subjected to pre-training program, is connected from three distinct locations on the body to the static structures by virtue of attachment means. These attachment means have wheels at the end in contact with the static structures.

In the process of pre-training, the animal is confined in a device, the lateral and rear sides of which are surrounded and similar to the device utilized in the training program. This device utilized for pre-training purpose is able to move in the static structures.

The animal subjected to pre-training process is fastened to the static structures via belts, cordons etc., from bit at the mouth of the animal, bridle at the head of the animal, and saddle at the upper region of the animal. By employing such pre-training facility, the animal is completely adapted to the automatic training process.

In the present application, some arrangements are embodied for stabilizing the location and increasing safety conditions of the animal in the training device. The animal is connected to the device from four distinct region of the body by belts, cordons etc. These regions are: the bit at the mouth region, bridle at the head region, the chest band at the chest region, and saddle at the upper region of the animal. These connection means are on the other hand connected to the training device by spring means for increasing flexibility thereof. The animal in the training device is able to make relative displacements with respect to the device. Furthermore, a mechanism is provided for suspending the animal in the device in case the animal totters or disconnects the contact of legs of the animal. For providing simulation conditions, various mass elements can be attached to the saddle, and the mass corresponding to the jockey is balanced during training.

The saddle is located on the upper side of the animal by virtue of a drum and motor mechanism, which mechanism includes a locking means for adjusting the vertical position of the saddle.

Another feature of the present invention is an alternative mechanical-based actuation mechanism for moving the training devices. According to this actuation mechanism, one or plurality of gears and platforms movable by these gears throughout the training racecourse are embodied.

For achieving an adaptation of the animal to the real-time racing conditions, some components have been embodied in the training device. The above-mentioned bit, bridle and chest band connection means are controlled by motors movable on sliding rails. The motors are actuated by an electronic unit so that optionally these connection means are pulled and released for controlling the animal. Furthermore, the saddle positioned on the animal is capable of rotating and translating in the three dimensional space. In other words, the saddle has six degrees of freedom.

Pulling and releasing, i.e. displacement, of the bit, bridle and chest band connection means are adjusted by the electronic control unit which is coded according to the training or race course distance so that, like the real-time racing conditions, the animal is stimulated in accordance with the certain distances with respect to the training course.

Furthermore, the lateral coverages of the training device are capable of moving so that the animal in the training device is positioned in certain locations.

Since the present invention provides a complete system for training of animals, especially the horses, a laboratory for monitoring the online performances of the animals during training program and optionally moved with the training device is embodied. In this laboratory, the following performance parameters may be monitored online:

- Measuring the heart functions of the animal by EKG (electro cardiograph).
- Taking blood samples for identifying physical conditions of the animal and for identifying potential diseases that may adversely affect the animal. Consequently, the following items can be deduced from the blood sample; blood cell (eritrosit), total protein, water percentage (dehydration), lactic acid, hemoglobin value, enzyme value, leucocyte value etc. can be determined.
- Identifying the conditions of the internal organs of the animal such as internal side of nose, stomach, etc., by endoscopic means for determining performance conditions of the animal.
- Identifying other parameters such as $CO_2$ value of the breath, respiration number per unit of time, body temperature, and data of urological system.
- Identifying dynamic analysis of bones of the animal by virtue of radioscopic means.
- Measuring strains of muscles of the animal.

During training, EKG measurement is performed via electrodes placed on particular body regions of the animal, and these measured values can be printed out or can be saved in a computer data carrier for later retrieval. The computer can be located in the mobile laboratory or in a different location other than the mobile laboratory.

During training, so as to take blood samples and analyze the above-mentioned parameters, an injection is placed on the animal. By doing so, various blood-related parameters are analyzed and the resultant data can be saved in a computer data carrier. The computer can be located in the mobile laboratory or in a different location other than the mobile laboratory.

As for the endoscopic facilities, since online measurement of endoscopy-related parameters can not be achieved, the measurement thereof is made immediately after the training by means of endoscopic means placed in the mobile laboratory. Resultant data of the endoscopic means can be saved in a computer data carrier. The computer can be located in the mobile laboratory or in a different location other than the mobile laboratory.

Respiration sequence, $CO_2$ value are determined by detecting means placed in front of the nose region of the animal, and the measured values are controlled by monitorization means online. Furthermore, resultant data of the these measurements can be saved in a computer data carrier. The computer can be located in the mobile laboratory or in a different location other than the mobile laboratory.

Body temperature measurement is performed by means of thermometer located at several regions of the body of animal. Resultant data of the temperature measurement can be saved in a computer data carrier. The computer can be located in the mobile laboratory or in a different location other than the mobile laboratory.

Radioscopic measurements are performed by various cameras placed in several locations of the training device. Resultant data of the radioscopic means can be saved in a computer data carrier. The computer can be located in the mobile laboratory or in a different location other than the mobile laboratory.

In addition to the above-mentioned parameters, during training, speed of the animal can be determined via a tacometer or a similar means. Resultant data of speed measurement can be saved in a computer data carrier. The computer can be located in the mobile laboratory or in a different location other than the mobile laboratory.

For the integrated animal training device comprising lateral and rear coverages surrounding the animal with control unit comprising self-powered motor and device direction control means, wheels are placed at the lower side of the lateral coverages. Furthermore, control unit integrated with the coverages are carried by another group of wheels.

Integrated animal training device is directed by virtue of the wheels placed at lower side of the lateral coverages. These wheels are connected to transmission pivots which are connected to further transmission means. These transmission means are actuated by hydraulic provided by self-powered motor placed in the control unit 10 at the rear region of the integrated animal training device.

For securing the location of the animal in the training device a confinement means is positioned at the lateral coverages of the training device.

An alternative integrated animal training device is also proposed in the scope of the present invention. In this alternative structure, the mechanism directing the front wheels includes mechanical components alongside the lateral coverages but not alongside the convex structures. Furthermore, some covering means comprising air bags are placed in the training device so that the animal can be held at a desired location in the device.

Another alternative embodiment includes connection means providing connection of the animal to the training device. In this alternative embodiment, instead of complete mechanical-based connection means, a magnetic-based connection is proposed. A magnet, e.g., an electromagnet, is disposed in the lateral coverages and a ring means connected from one end to the saddle and associated from other end with the electromagnet is controlled through magnetic force originated by the electromagnet.

Furthermore, another embodiment for the animal training device includes movable convex structures. The legs associated with the lateral coverages are capable of being displaced in housings formed in the lateral coverages.

DETAILED DESCRIPTION OF INVENTION

Figure 1:
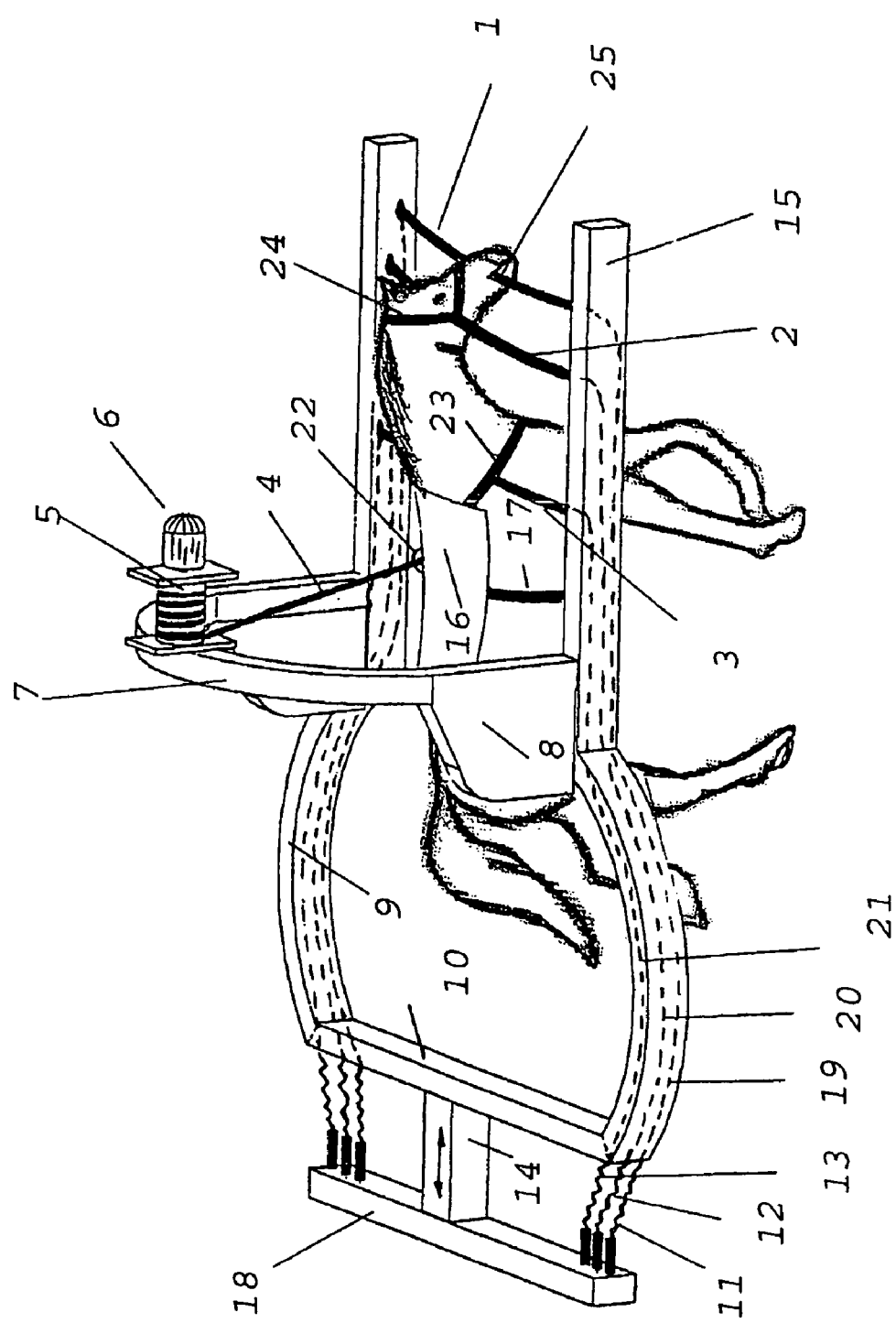
FIG. 1 illustrates the animal connection means to the training device and convex structures perpendicular to the ground in accordance with the present invention.

FIG. 1 illustrates the perspective view of the animal training device in accordance with the present invention. According to FIG. 1, the animal placed in the device is secured therein from four different location of the body. In this embodiment, bit connection means (1) connects the bit (25) from the mouth region of the animal to the lateral coverage (15); bridle connection means (2) connects the bridle (24) from the head region of the animal to the lateral coverage (15); chest band connection means (3) connects the chest band (23) from the chest region of the animal to the lateral coverage (15) are seen. The connection means mentioned above are placed symmetrically to the lateral coverage (15). Another connection means is the saddle connection means (4) connected from one end to the saddle (16) and connected from other end to the convex structures (7). This last connection means facilitates the animal to be suspended in the training device in case the animal totters or falls down.

The convex structure (7) surrounding the upper side of the training device has legs positioned to the lateral sides of the training device, which further includes, at the upper most region, a drum (5) and a motor (6) driving this drum (5). In the event of tottering or falling down of the animal, the force coming out as result of the mass of the animal caused by the gravity is interpreted by a sensor located at the drum (5) and accordingly, the drum is driven by the motor (6) and the animal is lifted in upwards direction by the saddle connection means (4) attached to the saddle via a ring (22) on the saddle (16).

Another function related to the motor (6) and the drum (5) is that once the animal is positioned in the training device, the vertical displacement of the saddle (16) is adjusted by means of this motor (6) and the drum (5). For achieving this goal, the saddle (16) is moved by the rotating the drum (5) via the motor (6), and the saddle (16) is positioned on the animal. The displacement extent of the saddle (16) is determined by a locking means (not illustrated in the Figure) placed on the drum (5).

The saddle (16) material may be made of silicon, rubber, plastic-based material and for achieving the simulation conditions with respect to the real racing conditions, and some load between 10 kg. to 70 kg. may be attached to the saddle (16).

Achievement of relative motion of the animal with respect to the training device, thereby facilitating a flexible interaction between the animal and the training device, involves several cordons located through the lateral coverages (15). Each cordon is connected from one end to respective bit connection means (1), bridle connection means (2), and chest band connection means (3). The connection point between the cordons and the connection means is the openings of the lateral coverage for the connection means. As it is seen in the FIG. 1, bit cordon (19) is attached to the bit connection means (1), bridle cordon (20) is attached to the bridle connection means (2), and chest band cordon (21) is attached to the chest band connection means (3). These cordons (19,20,21) are connected to springs, one ends of which are connected to the fixed body.

As seen in the FIG. 1, the bit cordon (19) is connected to the bit spring (11); the bridle cordon (20) is connected to the bridle spring (12); and the chest band cordon (21) is connected to the chest band spring (13). The stiffness coefficients of the springs (11,12,13) are different with respect to each other. The idea of embodying different springs having stiffness coefficients is to prevent the animal in the device to hurt himself as a result of relative movements in the device. According to this idea, the stiffness coefficients of the springs can be arranged in the following order: chest band spring (13)>bridle spring (12)>bit spring (11).

In the scope of the present invention, some components have been designed to prevent the animal from hurting himself in the training device. The backside of the training device corresponding to the rear legs of the animal is curved and covered by a flexible material. The curved backside (9) is then joined to the lateral sides (15) of the training device.

Another precautionary feature is a blockage part (8) having partially closed formation and placed between the lateral coverages (15) and convex structure (7). This blockage part (8) is covered by a flexible material.

A movable locator (10) is placed at the rear section of the training device for preventing the location alterations of the animal in the device, particularly at the initiation and termination periods of the training. The movable locator (10) is driven by a pushing means (14) which is run by hydraulic mechanism in forward and backward directions as shown in the FIG. 1. The movable locator can be placed at the front side of the training device (not shown in the Figure), whereby the animal in the device can be held at a predetermined position therein.

Figure 2A:
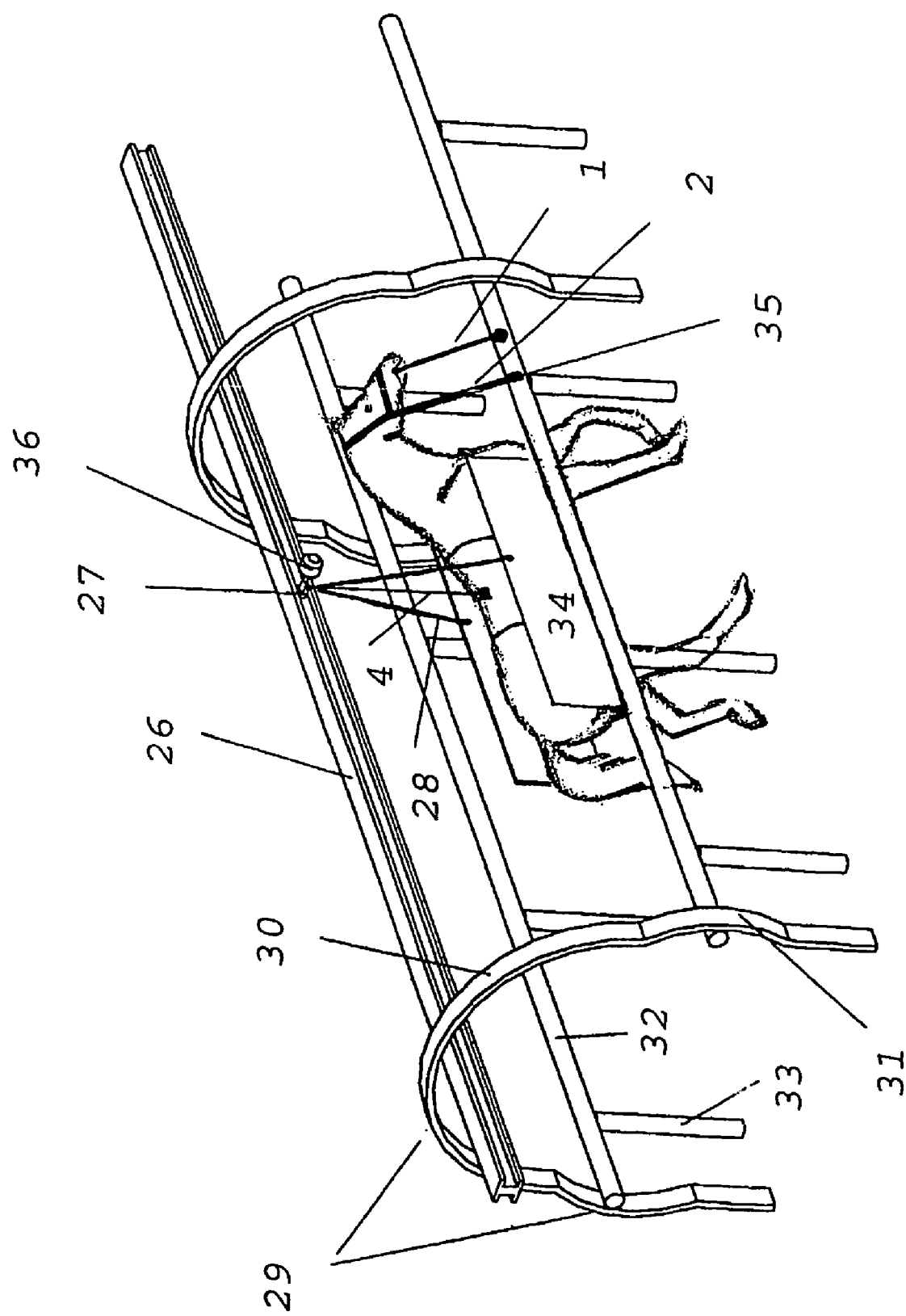
FIG. 2A illustrates the pre-training facility in accordance with the present invention.

In the FIG. 2A, pre-training facility is shown for facilitating pre-training before initiating essential training program. The object of employing such a pre-training facility is to adapt the animals to the essential training program. The pre-training facility comprises static and dynamic elements. The static elements comprises upper guides (26) arranged throughout the course in which wheels, pulleys can be moved; and frames (29) covering the other static elements throughout the course and arranged by predetermined spaces. The frames (29) having a convex structure comprise a frame upper element (30) having a curved formation and a frame bottom element (31). Furthermore, lateral guides (32) for guiding movable connection means are connected at one end to the animal and at the other end to the lateral guides (32). The lateral guides (32) are fixed to the ground via legs (33).

The dynamic elements in the scope of the present invention are characterized as follows. Similar to the animal training device, bit connection means (1) are connected from one end to the bit at the mouth region of the animal, and connected from other end to the wheels (35) moved on the lateral guides (32); bridle connection means (2) are connected from one end to the bridle at the head region of the animal, and connected from other end to the wheels (35) moved on the lateral guides (32). The animal subjected to the pre-training session is surrounded by plates (34) from the sides. Moving mechanism of the plates (34) is carried out by plate holders (28) connected to the wheels (27) moving in the upper guide (26). In addition to these technical features, the saddle (16) positioned on the animal is connected to the wheel (27) by saddle connection means (4).

Moving mechanism of the wheels (27), to which the plates (34) and the saddle (16) are connected, is provided by a motor (36) connected thereto.

The dynamic elements employed for pre-training session can be structured individually or as a group, in which case multiple training of the animals is then achieved. In the event of multiple pre-training facility, the moving of the wheels (27) can be achieved by employing a single motor (36) for each wheel (27), or alternatively, one single traction motor can be used for all wheels. In this way, rigid means can be employed between each plate pair for pulling thereof by a single traction motor.

Figure 2B:
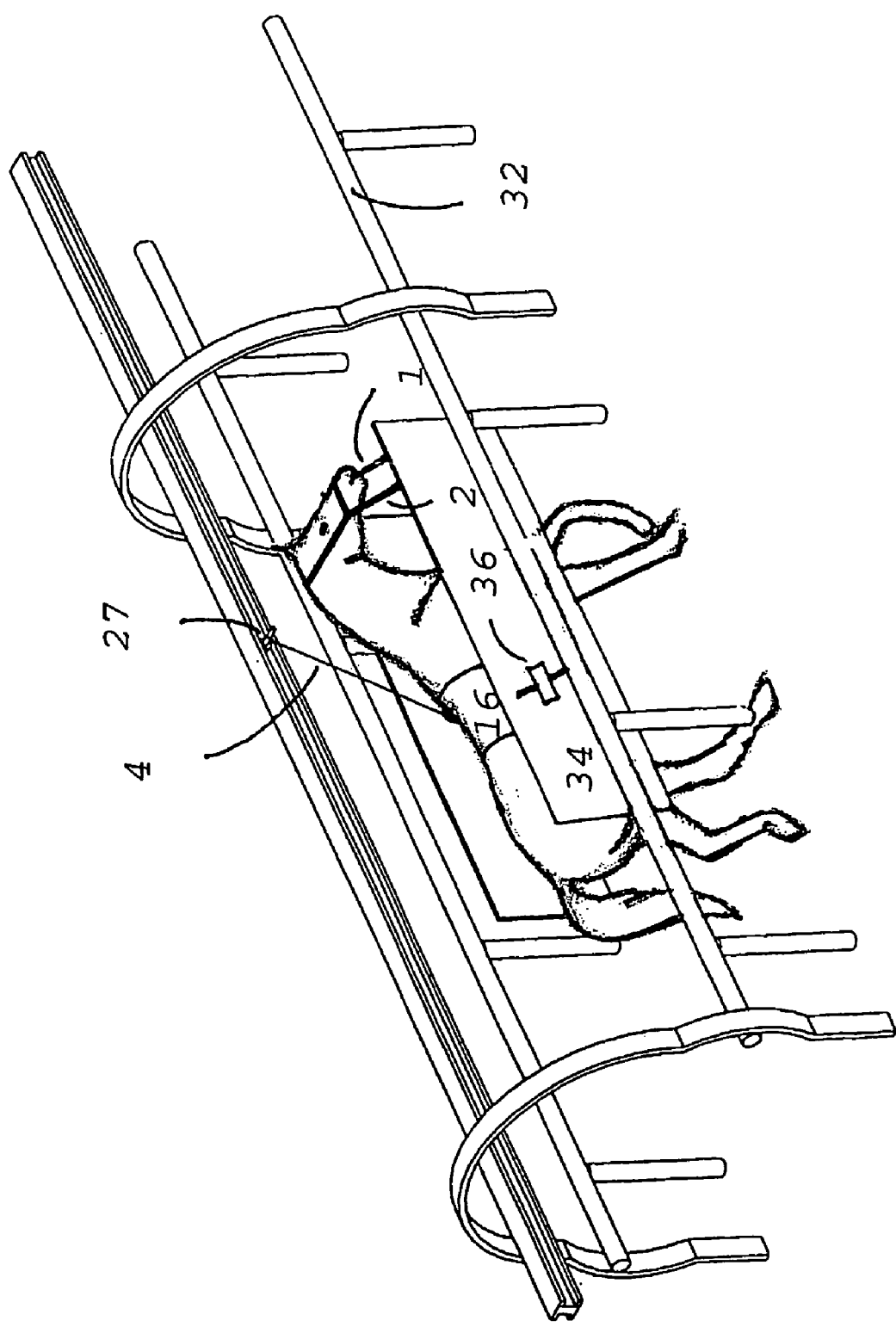
FIG. 2B illustrates the major components for alternative structures used for pre-training facility in accordance with the present invention.

In FIG. 2B, an alternative construction for the pre-training facility having mechanical connection means is shown. In this alternative structure, bit connection means (1) and bridle connection means (2) are fixed to the plates (34), and plate holders (28) are not connected to the wheels (27). Only the saddle connection means (4) is positioned on the saddle (16). Furthermore, the motor (36) actuating the system is not positioned in the upper guide (26) region. As seen in the FIG. 2B, the motor (36) is located to the lateral sides of the plates (34). The motor (36) is moved with the plates (34) by means of wheels disposed in the lateral guides (32).

The other plate (34), to which the motor (36) is not connected, is associated with the other lateral guides (32) via wheels.

Figure 7:
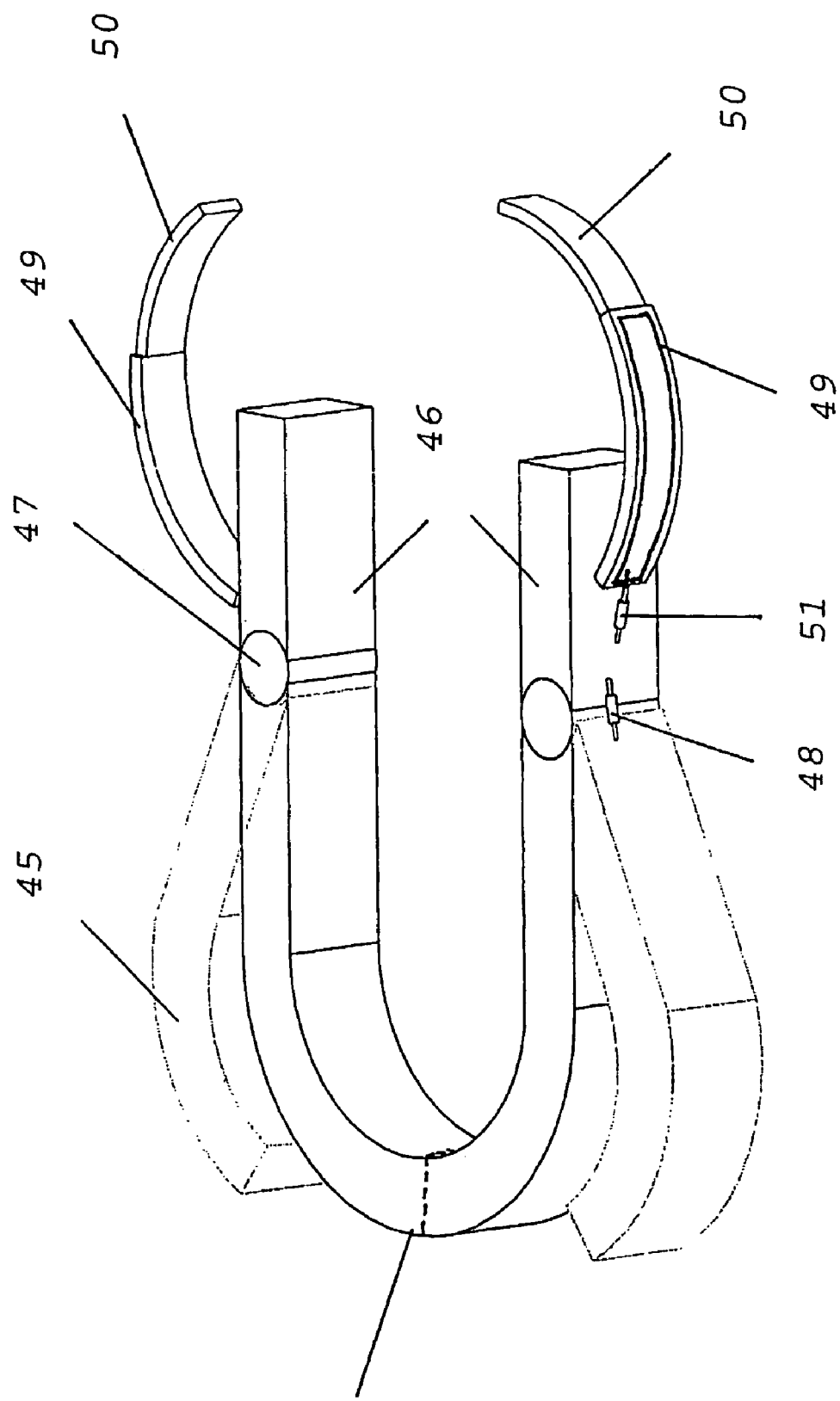
FIG. 7 illustrates the movable coverage and front blockage element for the training devices in accordance with the present invention.

Two embodiments of the instant invention are proposed. In FIG. 7, the rear side (coverage) (45) of the training device is opened by rotating around a joint (47) disposed in the lateral coverage of the training device. Therefore, the training device comprises a fixed front coverage (46) and a rear coverage (45), which can be opened. The opening motion of the rear coverage (45) is performed by an actuator and a hydraulic cylinder-piston mechanism (48). One end of the cylinder-piston mechanism (48) is fixed to the front coverage (46) and the other end is fixed to the rear coverage (45), which can be opened and closed. The rear coverage (45) and the front coverage are combined in an interface plane (52). There is a front blockage housing (49) fixed to the front coverage (46) side. In this front blockage housing (49), a front blockage element (50) is disposed, whereby a barrier is formed in front of the 15 animal in case of necessity. As seen in the FIG. 7, the front blockage element (50) is actuated preferably by a hydraulic-piston cylinder mechanism (51) for displacing the element (50).

Figure 8:
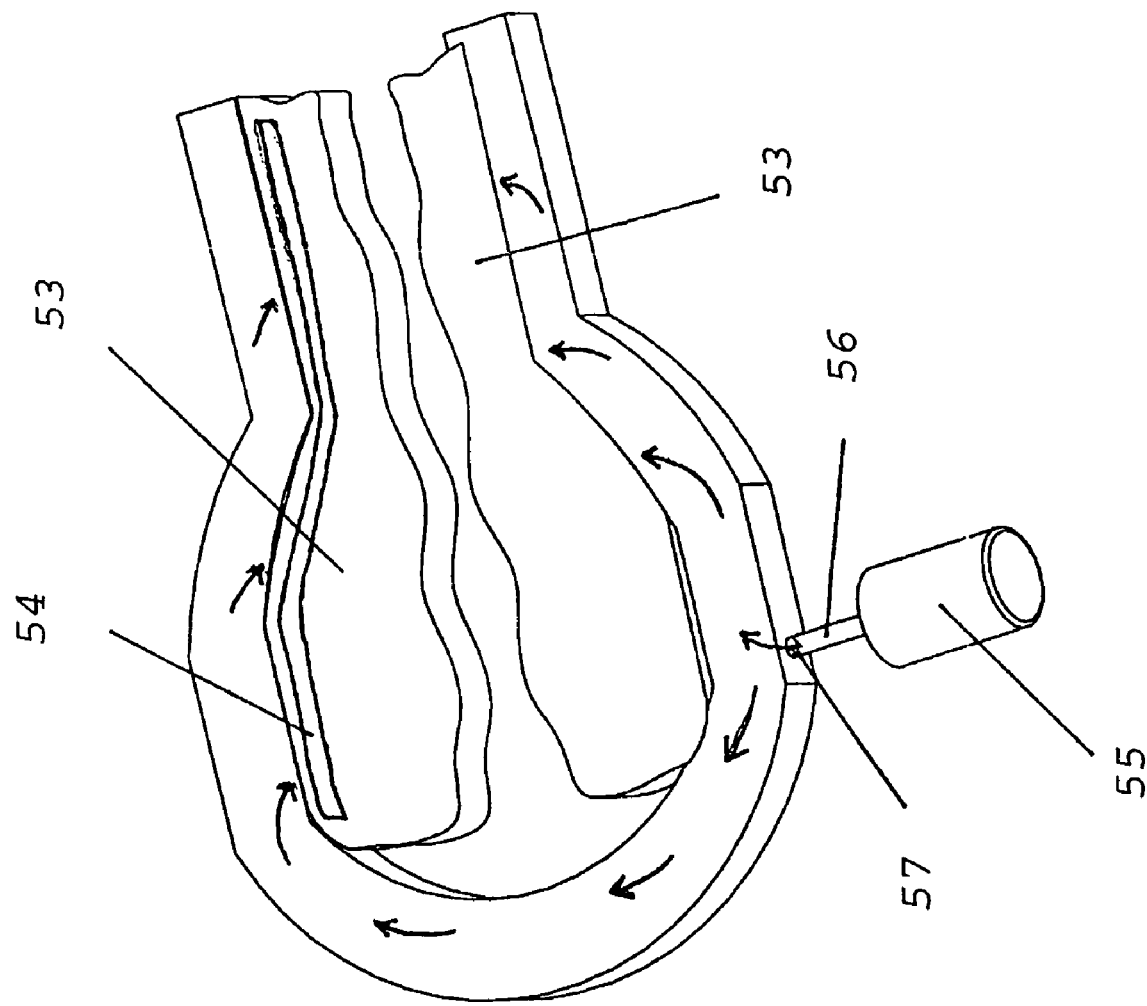
FIG. 8 illustrates the air-bags for fixing the location of the animal in the training device in accordance with the present invention.

In FIG. 8, air bags (53) for positioning the animal in the training device are illustrated. The air bags (53) are disposed in the lateral coverages of the device. Air is compressed by a compressor (55) and passed through the connection pipe (56). Afterwards the air is introduced into the air passages by air intake opening (57) and the air bags are blown up towards the outside. Consequently, the animal is held at a determined position in the device.

Figure 3:
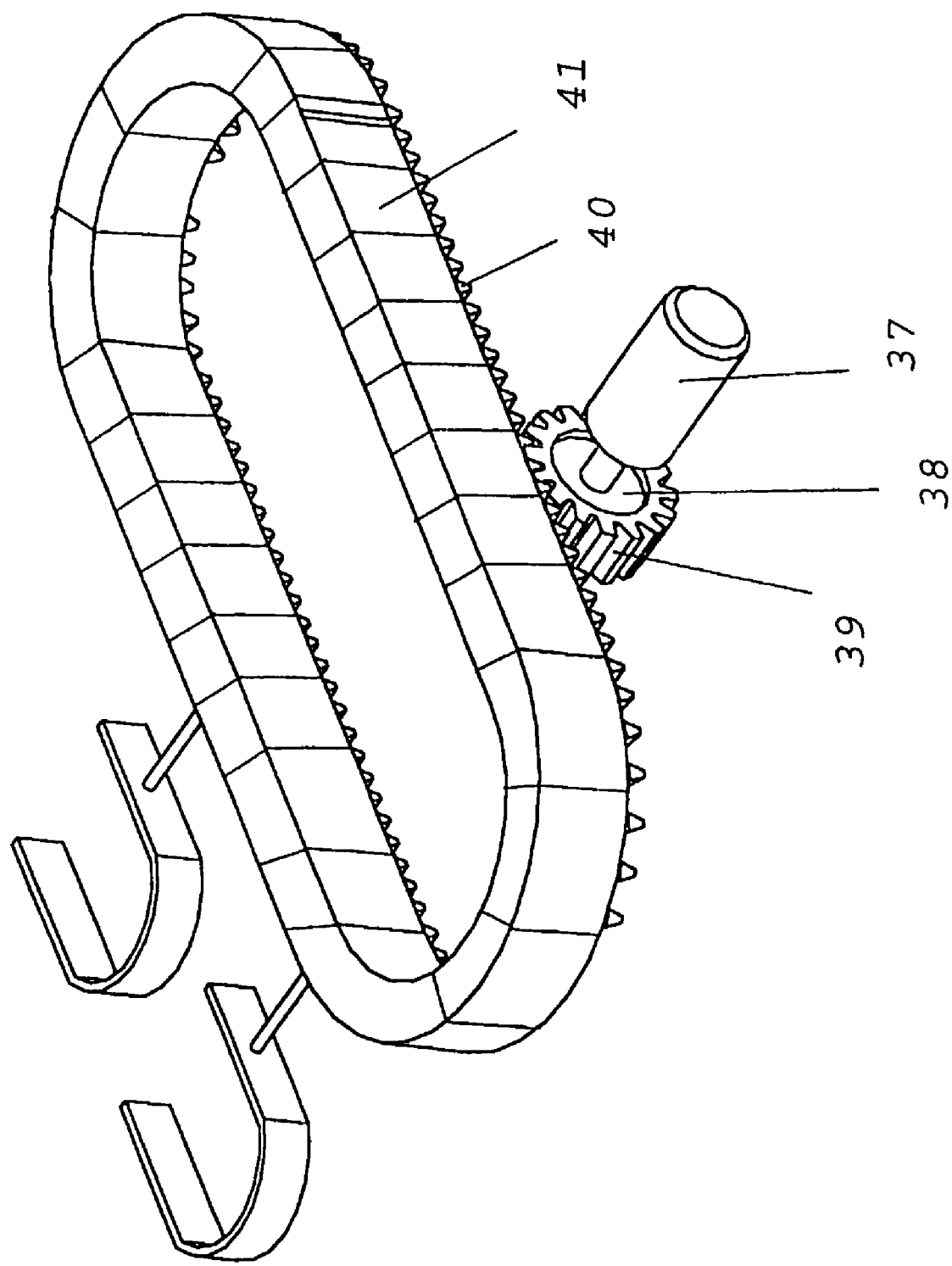
FIG. 3 illustrates the actuation mechanism of the training devices in accordance with the present invention.

An alternative structure is seen in the FIG. 3 for moving the training devices. According to the FIG. 3 the moving mechanism comprises a mobile platform (41) and an actuator gear wheel (38) driven by a motor (37) for the platform. As seen in the FIG. 4A, the mobile platform (41) has preferably a U profile and at the bottom side mobile platform teeth (40) are formed. These teeth are in contact with the actuating teeth (39) so that displacement of platform is performed. Since the training course comprises curved sections, the mobile platform (41) includes plurality of pieces for rotating when the curved sections are being turned.

As the training devices are fixed to the pieces, turning of the devices is achieved as the mobile platform pieces are turned around the curved sections. The mobile platform (41) can be driven with more than one actuator gear wheel (38) or one single actuator gear wheel (38).

Figure 4A:
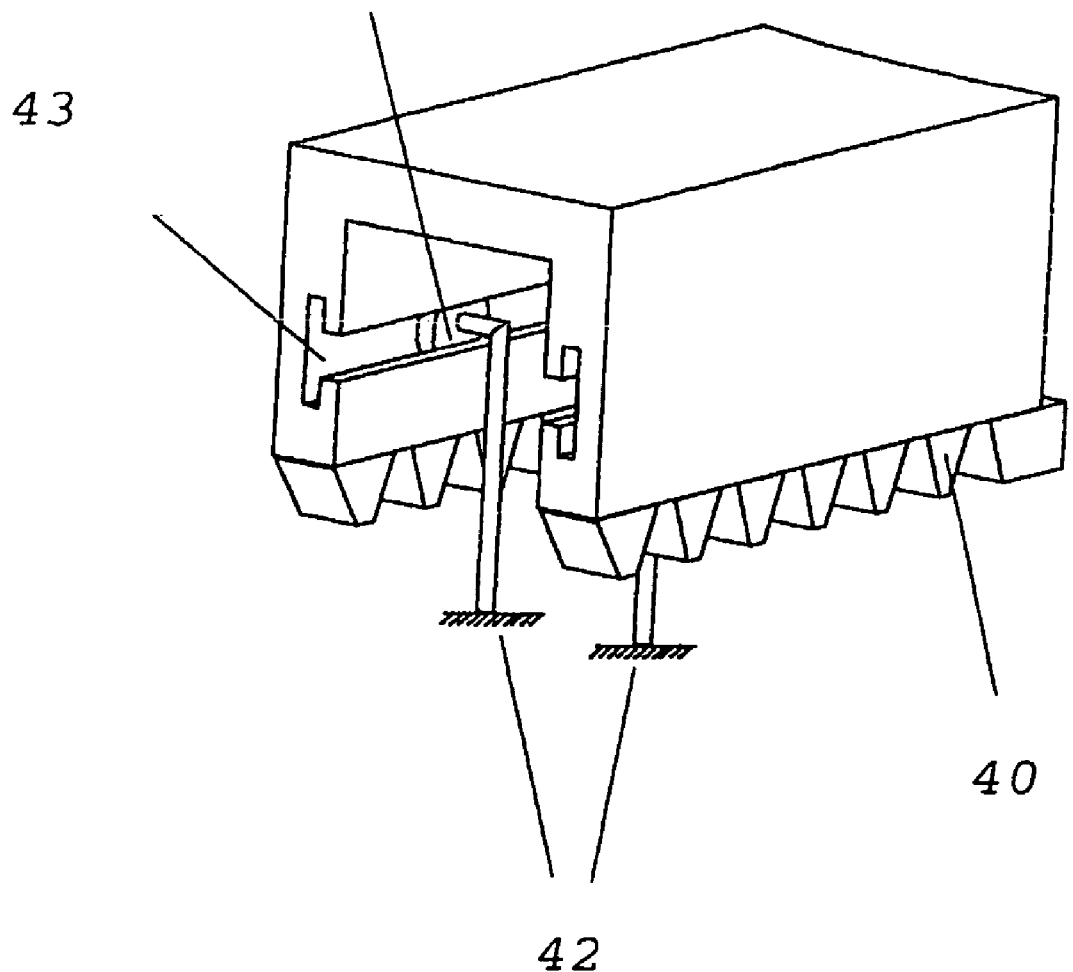
FIG. 4A illustrates the detailed view of mobile platform for the training devices in accordance with the present invention.

In FIG. 4A, the detailed view is given of the mobile platform (41). In order to provide a predetermined trajectory of the mobile platform (41), it should be guided accordingly. To achieve this, grooves (43) are formed in the inner lateral planes of the mobile platforms (41) having U shape. In these grooves (43) rotatable means like wheels (44) are disposed. The wheels (44) are fixed to the ground via holders (42).

Figure 4B:
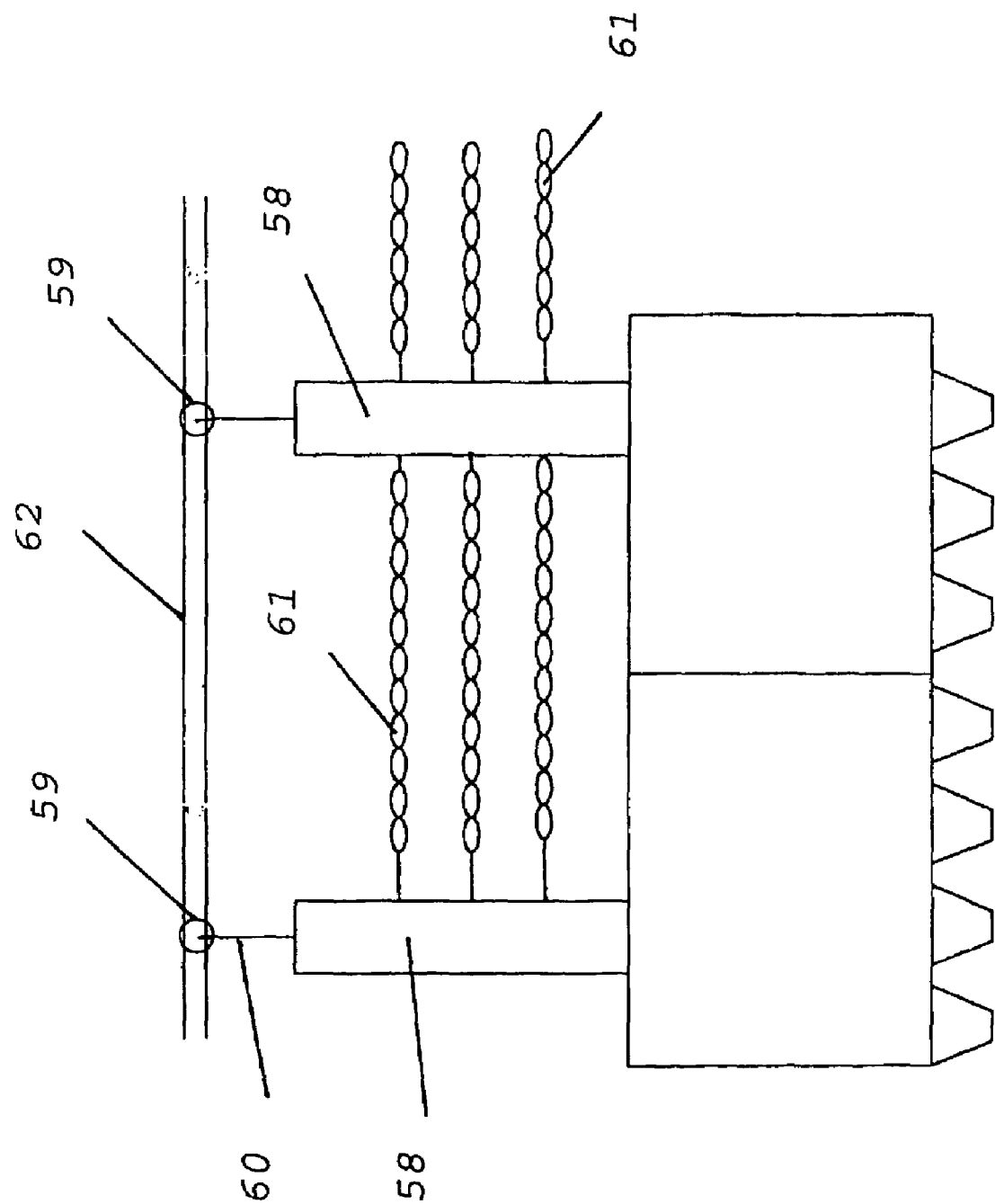
FIG. 4B illustrates the chain mechanism for actuating multiple training devices in accordance with the present invention.

In FIG. 4B, chain mechanism is illustrated for attaching the training devices to each other. In this chain mechanism, the following are provided: a column (58) situated on the mobile platform (41); pins (60) embodied in the upper region of the columns (58); and wheels (59) disposed between the pins (60). The wheels (59) are capable of moving in the rail located throughout the training course. The chains (61) are positioned between the mobile platforms (41). The mobile platform (41) is moved by a gear mechanism.

Figure 5:
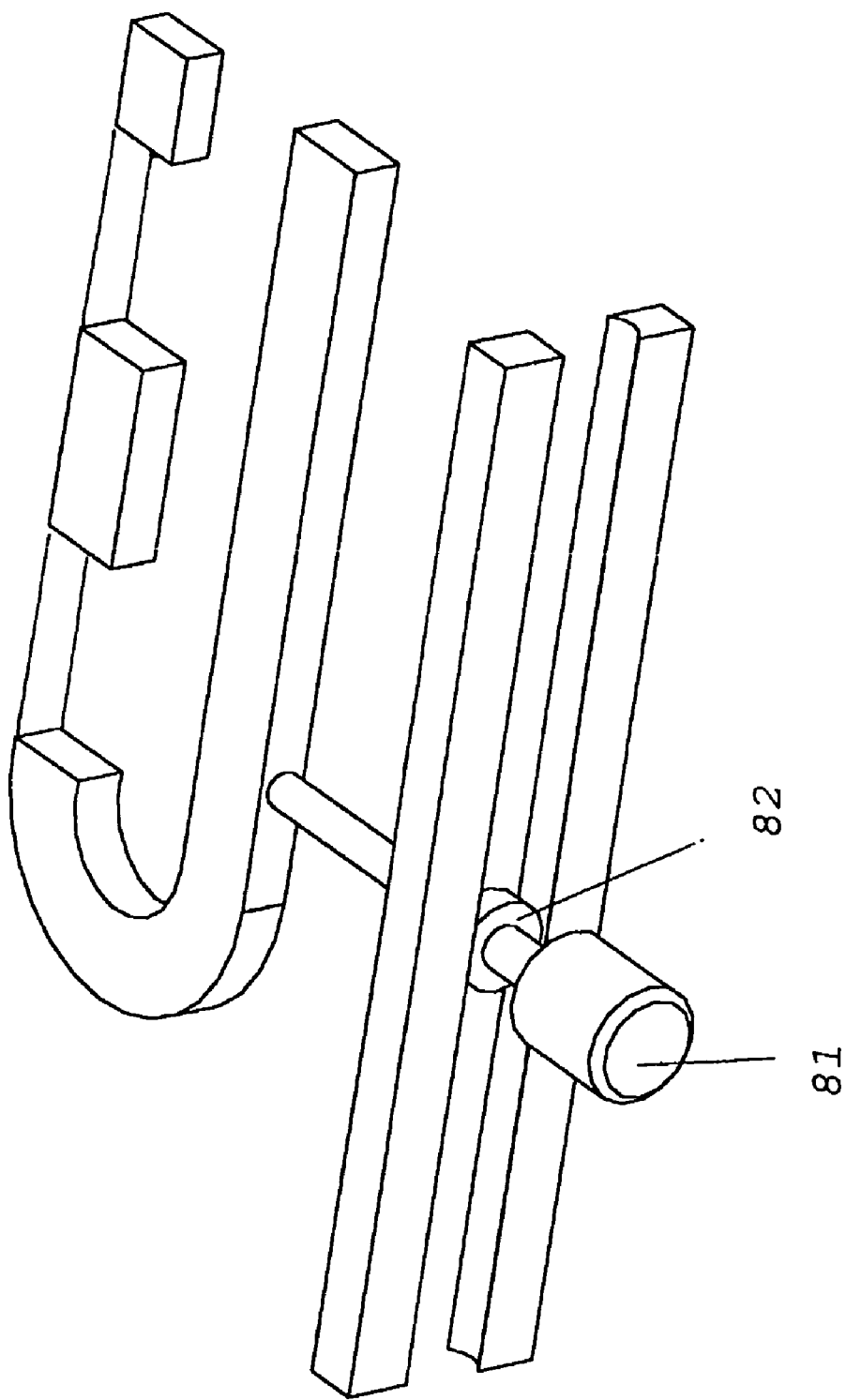
FIG. 5 illustrates the actuation mechanism of the training devices at the lateral sides thereof in accordance with the present invention.

In FIG. 5, an actuation mechanism is illustrated for the training devices throughout the training course. According to the FIG. 5, wheels (82) movable in rail by means of motors (81) are seen. Training devices can be driven by a plurality of motors connected to each wheel, or alternatively devices can be driven by one single motor, which is coupled to one pulling training device. For the latter case, the other training devices are connected to each other by some rigid mechanical components like chains.

Figure 6:
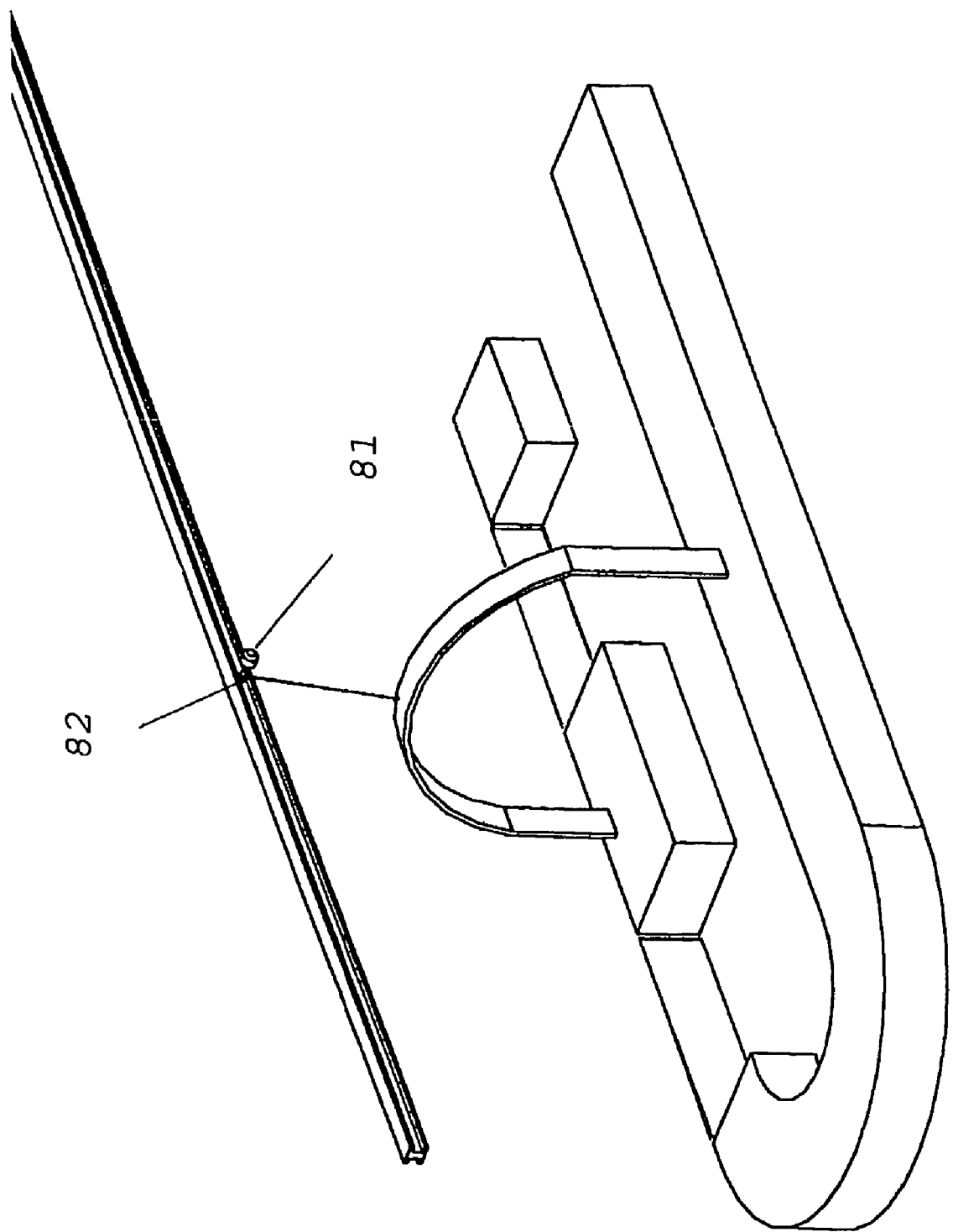
FIG. 6 illustrates the actuation mechanism of the training devices at upper side thereof in accordance with the present invention.

Similar embodiment is shown in the FIG. 6. In this FIG. 6, training devices are moved by wheels (82) positioned at upper side thereof and driven in rail. Each training device can be moved by a motor coupled to each wheel, or alternatively there can be only one dedicated pulling device employed for drive driving the other training devices by a motor connected to the wheel of the pulling device. For the latter case, the other training devices are connected to each other by some rigid mechanical components like chains.

Figure 9:
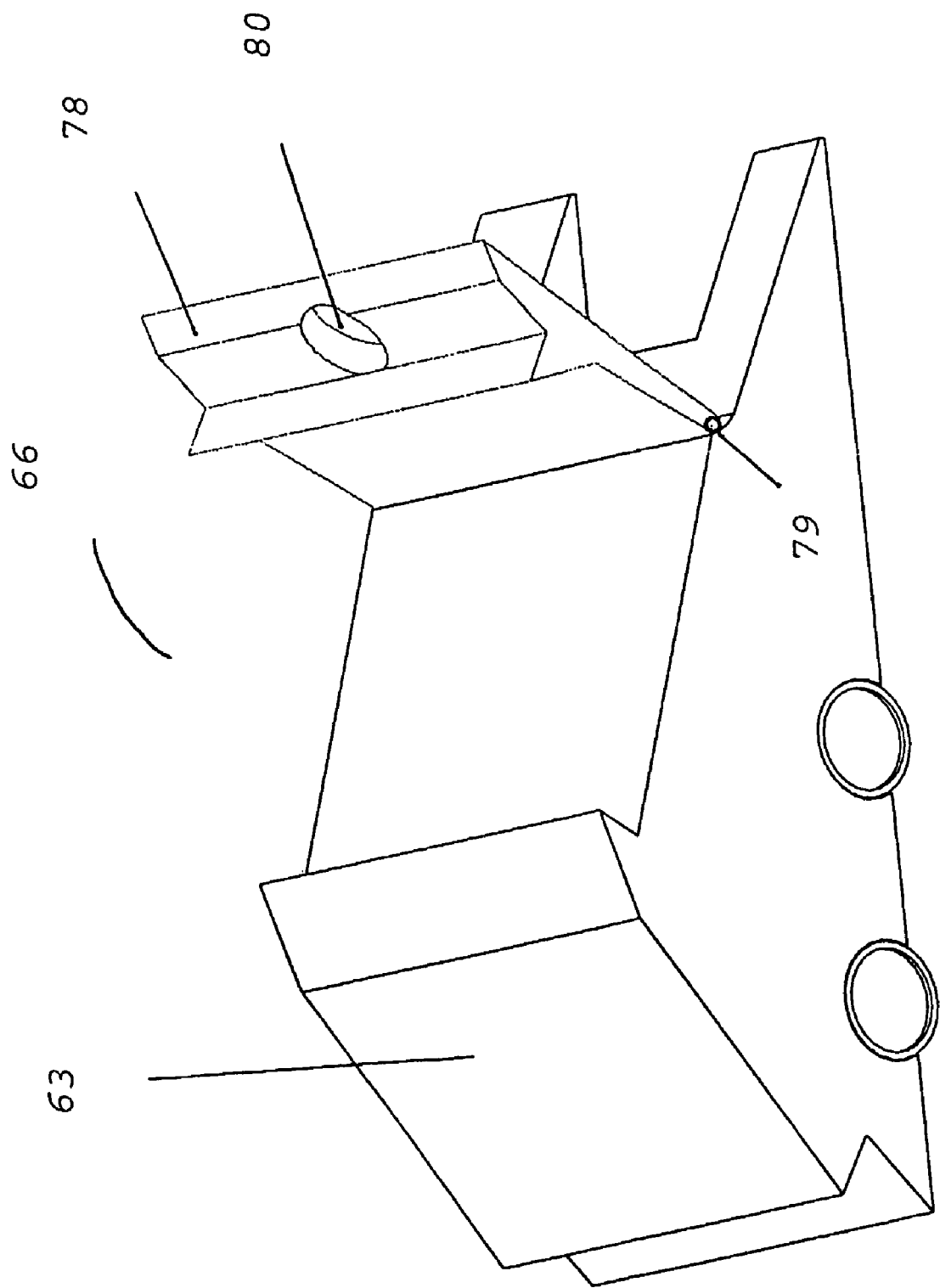
FIG. 9 is a perspective view of the closed-form training device with laboratory unit in accordance with the present invention.

In FIG. 9, a closed-form training device is illustrated. The closed-form training device is designed to close the lateral and upper sides thereof. In FIG. 9, a mobile laboratory (63) device is attached at the rear section of the training device. In other words, the training device and the laboratory unit (63) form a closed-form mobile unit (66). A lid (78) is embodied in front of the mobile unit (66) the lateral, rear and upper side are closed. The lid (78) is capable of moving downwards and upwards by virtue of hinges (79). Furthermore, an opening (80) is formed in front side of the lid (78) so that the head of the animal can be projected.

Figure 10:
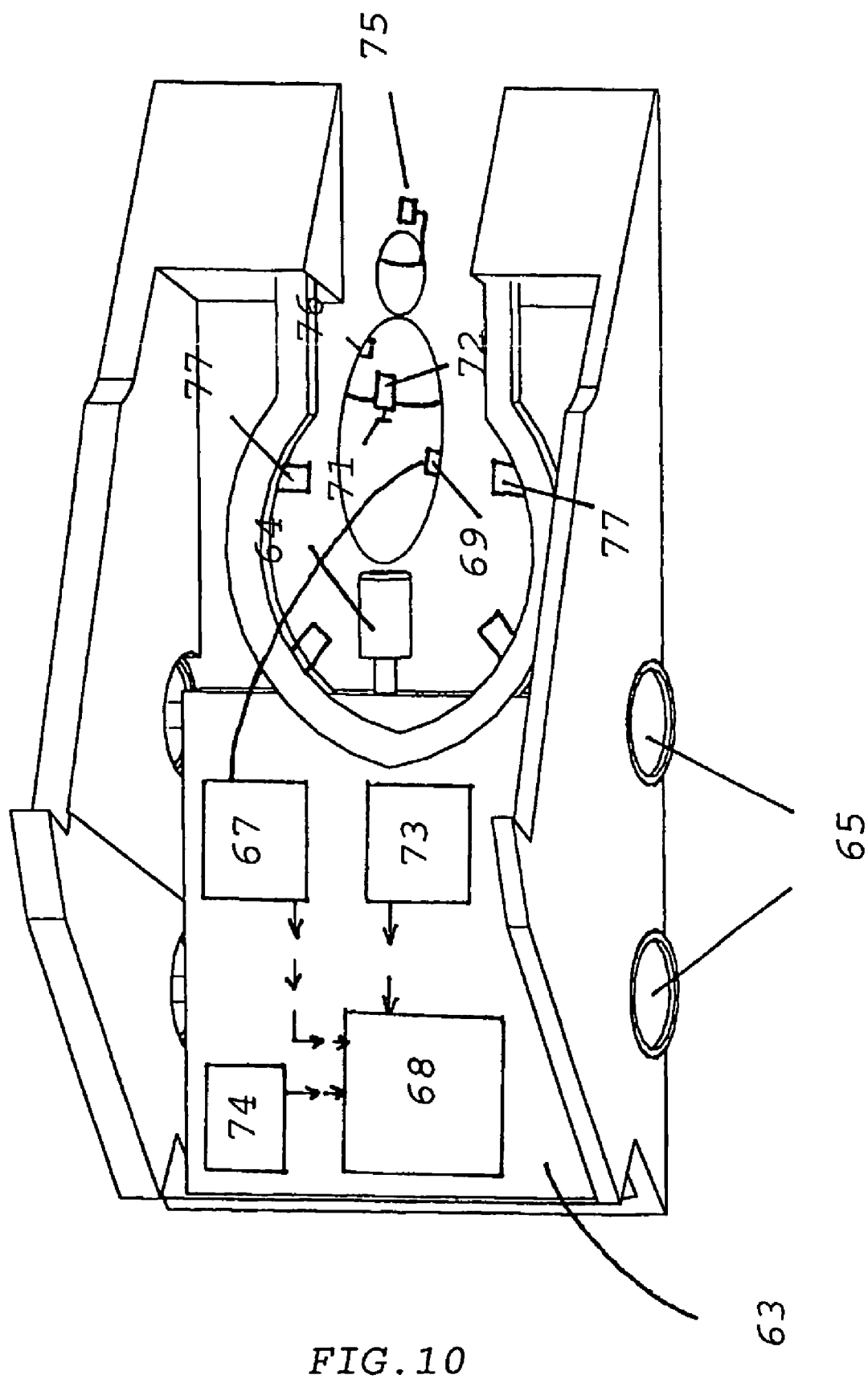
FIG. 10 illustrates the inner components of the closed-form training device with laboratory unit in accordance with the present invention.

The training device is driven by a motor (64) e.g., an internal combustion engine, and moved on the wheels (65) as seen in the FIG. 10. In order to monitor the EKG of the animal being trained, some electrode means (69) are positioned on the body of the animal. Signals obtained from the electrode means (69) are transmitted by EKG cables (70) to the EKG device (67) in the laboratory (63) and can be printed out. In addition to that, the signals obtained from the EKG device (67) are transmitted to the computer (68) and can be stored in this computer (68) for retrieval any time. The computer (68) can be located anywhere other than the training device.

During training or following the training session, a needle means (71) is positioned on the body of the animal for receiving blood samples from the animal. The received blood sample can be accumulated in a tub (72). As it seen in the FIG. 9, the received blood sample is transmitted to blood test analyzer (73), and the data obtained from analysis can be stored in the computer (68) for retrieval any time.

In order to observe the conditions of the stomach, bronchus and nose of the animal just after the training session, endoscopic elements (74) are located in the mobile laboratory. The data obtained from the endoscopic element can be stored in the computer (68) for retrieval at any time.

In order to observe respiration conditions of the animal during training, a respiration meter (75) is positioned near the nose region of the animal. The data obtained from the respiration of the animal can be stored in the computer (68) for retrieval at any time.

The animal subjected to training is observed in terms of body temperature changes during the training by means of thermometers (76) located at various regions of the body. The data obtained from the thermometers can be stored in the computer (68) for retrieval at any time.

Dynamic analysis of the animal being trained is performed by radioscopic means such as cameras (77) positioned at various regions of the training device. The data obtained from radioscopic means can be stored in the computer (68) for retrieval at any time.

The computer (68) mentioned above for storing the results of analysis can be located in the training devices or alternatively in any fixed region as a main frame computer.

Figure 11:
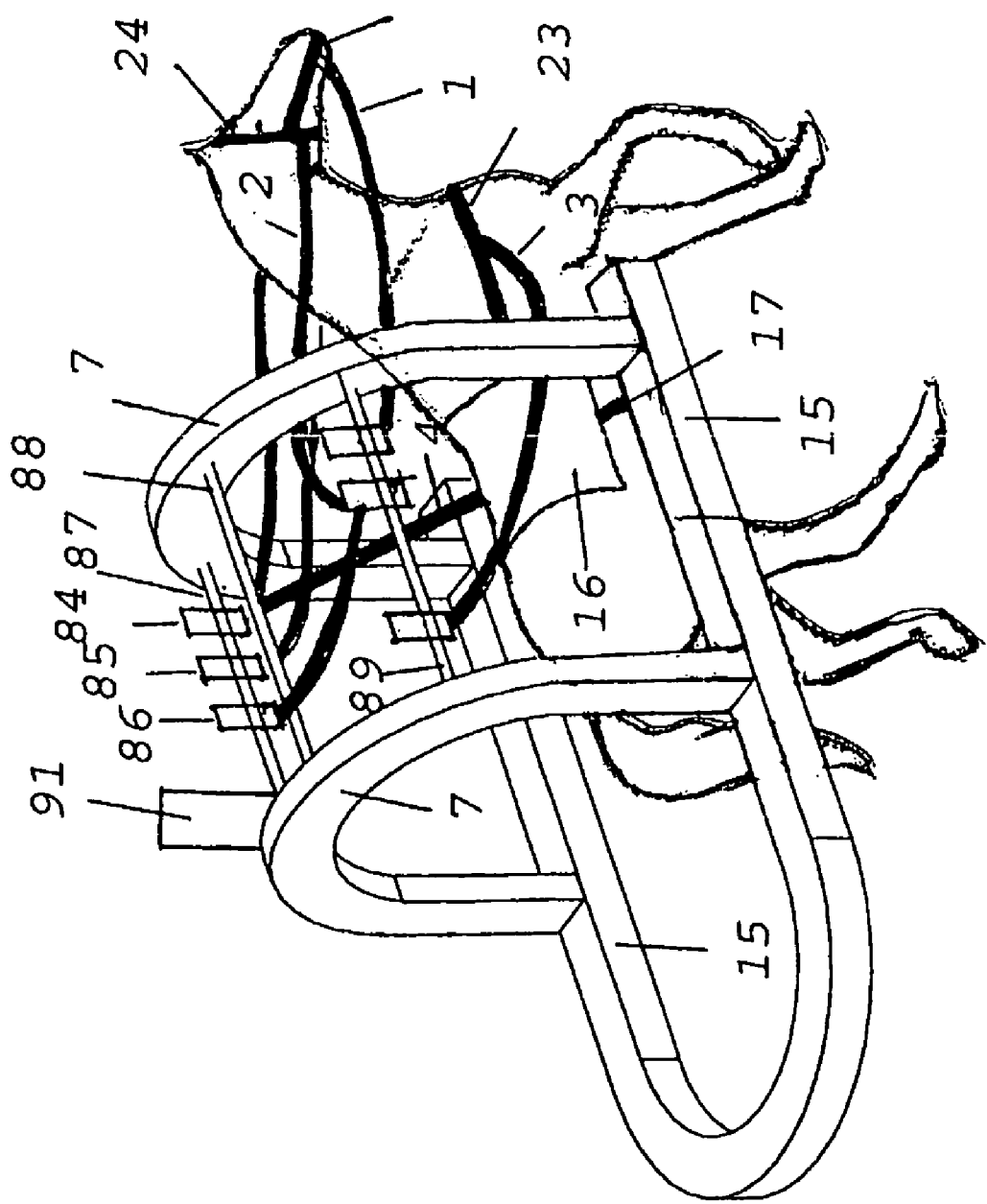
FIG. 11 illustrates electronic displacement-controlled connection means in accordance with the present invention.

FIG. 11 illustrates electronic displacement controlled connection means.

According to the figure, the animal in the training device is connected to the device from three different locations, i.e., by bit connection means (1), bridle connection means (2) and chest band connection means (3). The other connection means is the saddle holder (17) surrounding the body of the animal. The saddle (16) is connected to a middle sliding means (88) structured between two convex structures (7) by means of a saddle connection means (4) as seen in the FIG. 11.

The motors (84,85,86) controlling the animal during training are positioned axially on the side sliding means (87,89), which are embodied between the convex structures (7). Axial movement of the motors (84,85,86) facilitates the stretching and loosening of the connection means (1,2,3) and then the animal is controlled according to the training conditions.

In accordance with the present invention, the movement of the motors (84,85,86) placed on the side sliding means (87,89) is achieved by an electronic control unit (91) providing real-time racing conditions. For example, in real-time racing conditions, e.g., in the first 1000 m., the connection means (1,2,3) are relatively stretched and particularly in the last distances towards the finish the connection means (1,2,3) are relatively loosened. Therefore, considering the real race distances such as 2400 m. the animal is controlled by stretching and loosening the connection means (1,2,3) by virtue of motors (84,85,86) actuated by the electronic control unit (91). Displacement amount of the motors (84,85,86) is achieved by coding the distance data into the electronic control unit (91). Furthermore, the electronic control unit (91) is a programmable unit so that the training conditions may be altered according to training distance. The electronic control unit (91) can be alternatively placed anywhere other than the training device.

Figure 12:
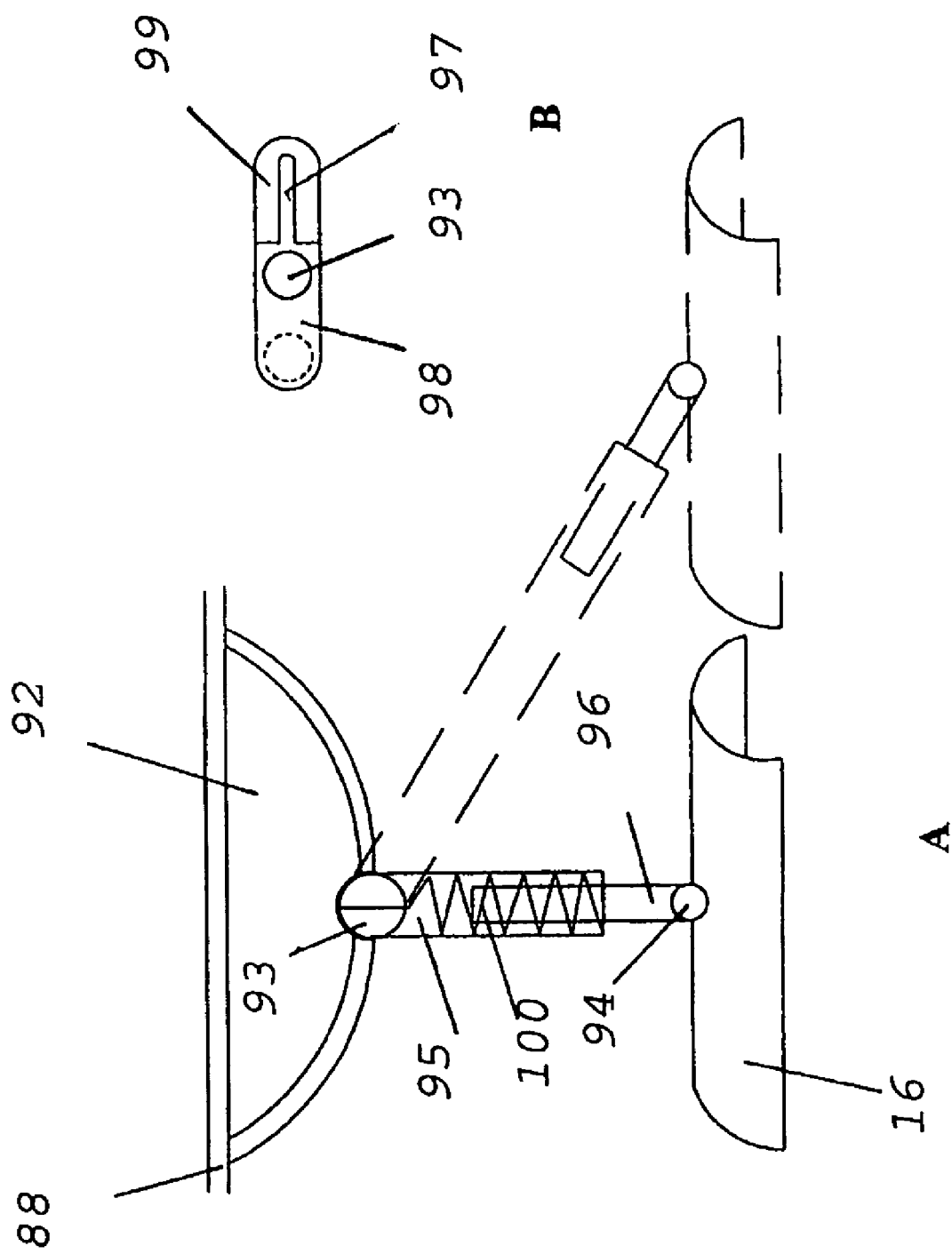
FIG. 12A illustrates saddle mechanism with 6 degree of freedom in accordance with the present invention.
FIG. 12B illustrates the top view of the saddle in accordance with the present invention.

In FIG. 12A, the saddle (16) having six degree of freedom is viewed. This saddle (16) is connected to the middle sliding means (88) by saddle connection means (4). According to the figure, a saddle bear (92) is engaged to the middle sliding means (88), and in the saddle bear (92) an upper spherical joint (93) pivotable in the perpendicular directions is disposed. At the bottom region of the upper spherical joint (93), a fixed cylinder (95) is located and a movable cylinder (96) capable of displacing in this fixed cylinder (95) is placed. A spring (100) is disposed in the fixed cylinder (95) for damping sudden forces originating from the animal.

A lower spherical joint (94) is placed at the connection point of the movable cylinder (96) and the saddle (16), whereby the saddle (16) is capable of pivoting in three perpendicular directions. In the fixed cylinder (95), some hydraulic fluid is accumulated for providing damping effect for the movable cylinder (96).

In case of variation in the animal position in the training device, the saddle (16) and the cylinders (95,96) are displaced to the position shown by dashed lines as in FIG. 12A. For more flexible structures, the number of cylinders can be increased.

In FIG. 12B, the top view of saddle bear (92) is illustrated. As seen in the figure, displacement of the upper spherical joint (93) is restricted by an obstruction part (99). The obstruction part (99) has a U shape and comprises an aperture (97). The upper spherical joint (93) is capable of moving in a housing (98). In the figure, the dashed lines correspond to the position of the dashed lines in FIG. 12A.

Figure 13:
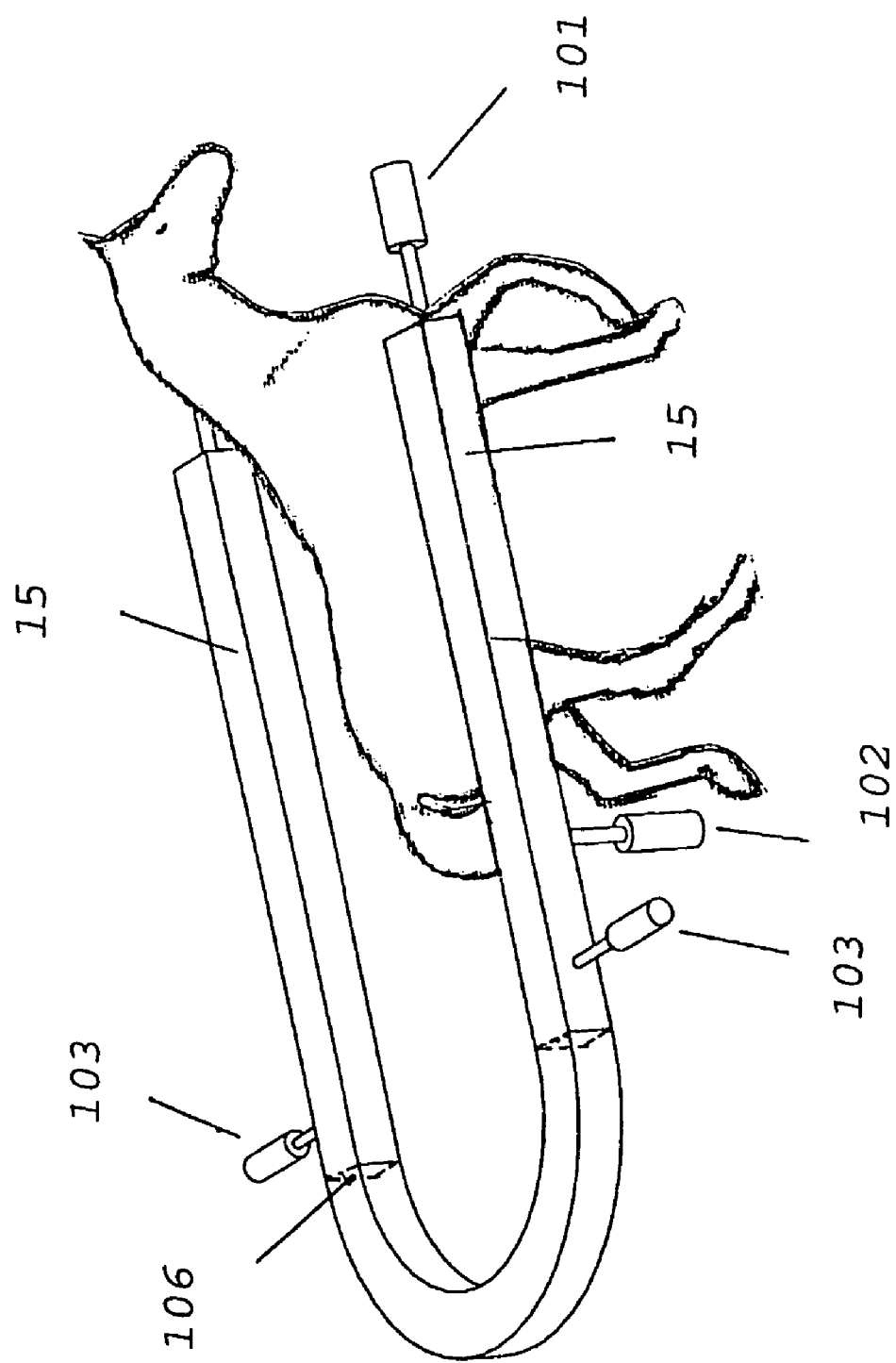
FIG. 13 illustrates lateral coverages of the training device in accordance with the present invention.

In FIG. 13, lateral coverages (15) of the training device are shown. In this alternative embodiment, the lateral coverages (15) are displaced via several actuation means. For moving the coverages (15) in the axial direction, an axial actuation means (101), in the width direction an horizontal actuation means (103), and in the vertical direction a vertical actuation means (102), are embodied. These actuation means (101,102,103) are connected to the lateral coverages (15) and can be both manually and electronically controlled. In FIG. 13, the displacement extent of the lateral coverages (15) is zero and once the lateral coverages (15) are moved the displacement will be gained with respect to the interfaces (106).

Figure 14:
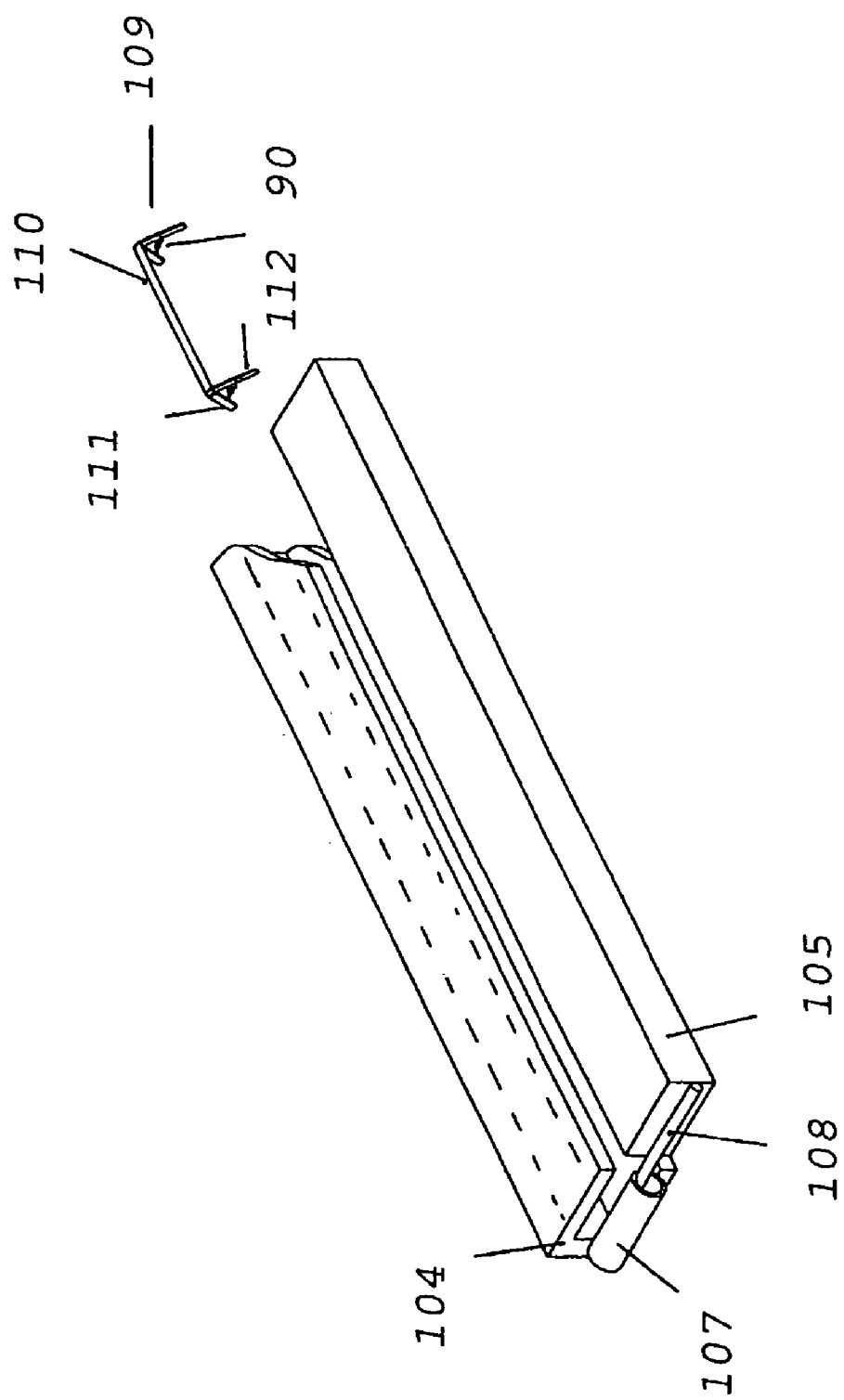
FIG. 14 illustrates the lateral coverages, one within the other, in accordance with the present invention.

FIG. 14 illustrates the coupling of lateral coverages capable of being introduced one within the other. This construction provides a flexible structure in the case of animal kicking the lateral coverages (15). According to the figure, an outer coverage (104) and an inner coverage (105) movable in the outer coverage (104) are embodied. For penetration of the inner coverage (104) into the outer coverage (105), a housing (107) is positioned to the outer coverage (104) and a slipway is positioned to the inner coverage (105), so that the slipway (108) can be penetrated into the housing (107).

As seen in the FIG. 14, a spring element (109) is placed between the outer coverage (104) and inner coverage (105). The spring (109) comprises an outer leg (111) attached to the outer coverage (104) and an inner leg (112) attached to the inner coverage (105). These legs (111, 112) are connected by a pivot (110) and a middle spring (90) is disposed between these legs (111,112).

Figure 15:
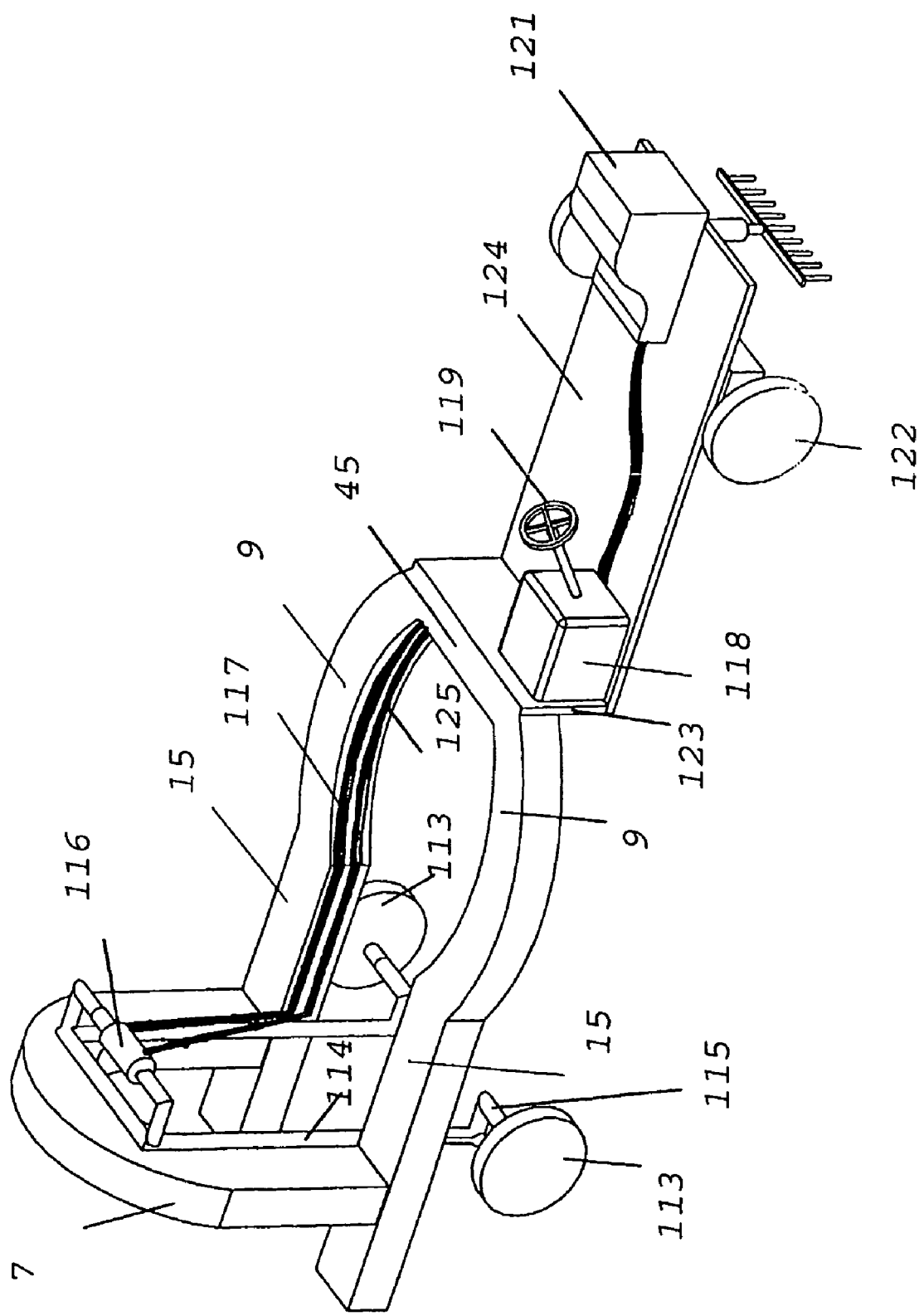
FIG. 15 illustrates the perspective view of the integrated animal training device in accordance with the present invention.

FIG. 15 illustrates the perspective view of the integrated animal training device. According to the figure, a rear unit (124) is integrated with the coverages through an intermediary part (123). A self-powered motor (121) is placed onto the rear unit (124). Rotational movement originated from the self-powered motor (121) is transmitted to rear wheels (122) by differential mechanism.

Guidance of the integrated animal training device is provided by front wheels (113). Changing the direction of the front wheels (113) is achieved by hydraulic supplied from the self-powered motor (121). Hydraulic is pumped by the self-powered motor (121) and transported by a pipe (120) to a valve (118) located under the steering wheel (119).

As the steering wheel is turned, a pivot connected to the steering wheel (119) directs the hydraulic through valve channels, and then the hydraulic is transmitted by primary hydraulic line (117) or secondary hydraulic line (125) to the appropriate piston (116) chamber. The piston (116) is placed at substantially upper part of the convex structure (7) and on a piston-actuating pivot (126) for actuating this pivot.

As seen in the FIG. 15, the primary and secondary hydraulic lines (117,125) are connected to two separate chambers in which cylinders of the piston (116) are disposed. Once the valve (118) is directed through the steering wheel (119), hydraulic is accumulated into one of these chambers of the piston (116) whereby the piston (116) actuates the piston-actuating pivot (126) linearly in horizontal direction.

Figure 16:
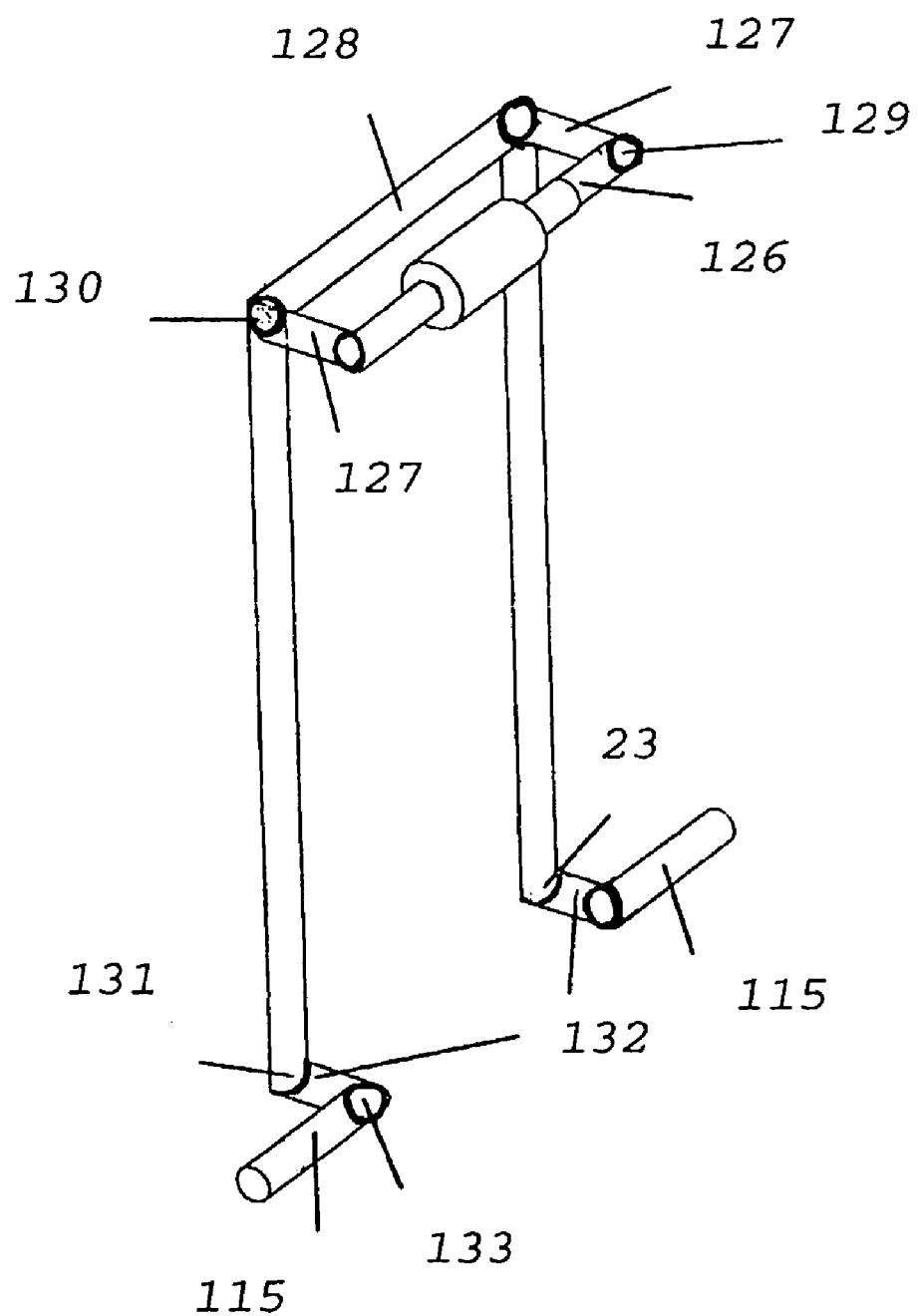
FIG. 16 illustrates the directing wheels of the integrated animal training device in accordance with the present invention.

As illustrated in FIG. 16, as the piston-actuating pivot (126) is moved, an upper connecting rod (127) is actuated accordingly. For structural integrity, an actuator pivot bearing (129) is placed between the piston-actuating pivot (126) and the upper connecting rod (127). The movement is further transmitted to a rotary pivot (114) connected from one side to the upper connecting rod (127) and placed in vertical direction. For supporting the structure, a beam (128) is embodied at the junction point of the upper connecting rods (127) and the rotary pivots (114), parallel to the piston (116). Rotary motion of the rotary pivots (114) is transmitted to lower connecting rods (132) through lower connecting rod bearings (131) and the motion is further transmitted to direction arms (115) connected at one end to the front wheels (113) and connected at other end to lower connecting rods (132). Similarly, for structural integrity, a direction arm bearing (133) is placed between the direction arm (115) and the lower connecting rod (132). Since the direction arms (115) are placed relatively distant from the front wheel (113) centers, directing the front wheels (113) is achieved simply.

Front wheels (113) directing mechanism is mounted at upper side, i.e., alongside the convex structures (7), such that the animal to be trained can be introduced into and leave the training device.

Figure 17:
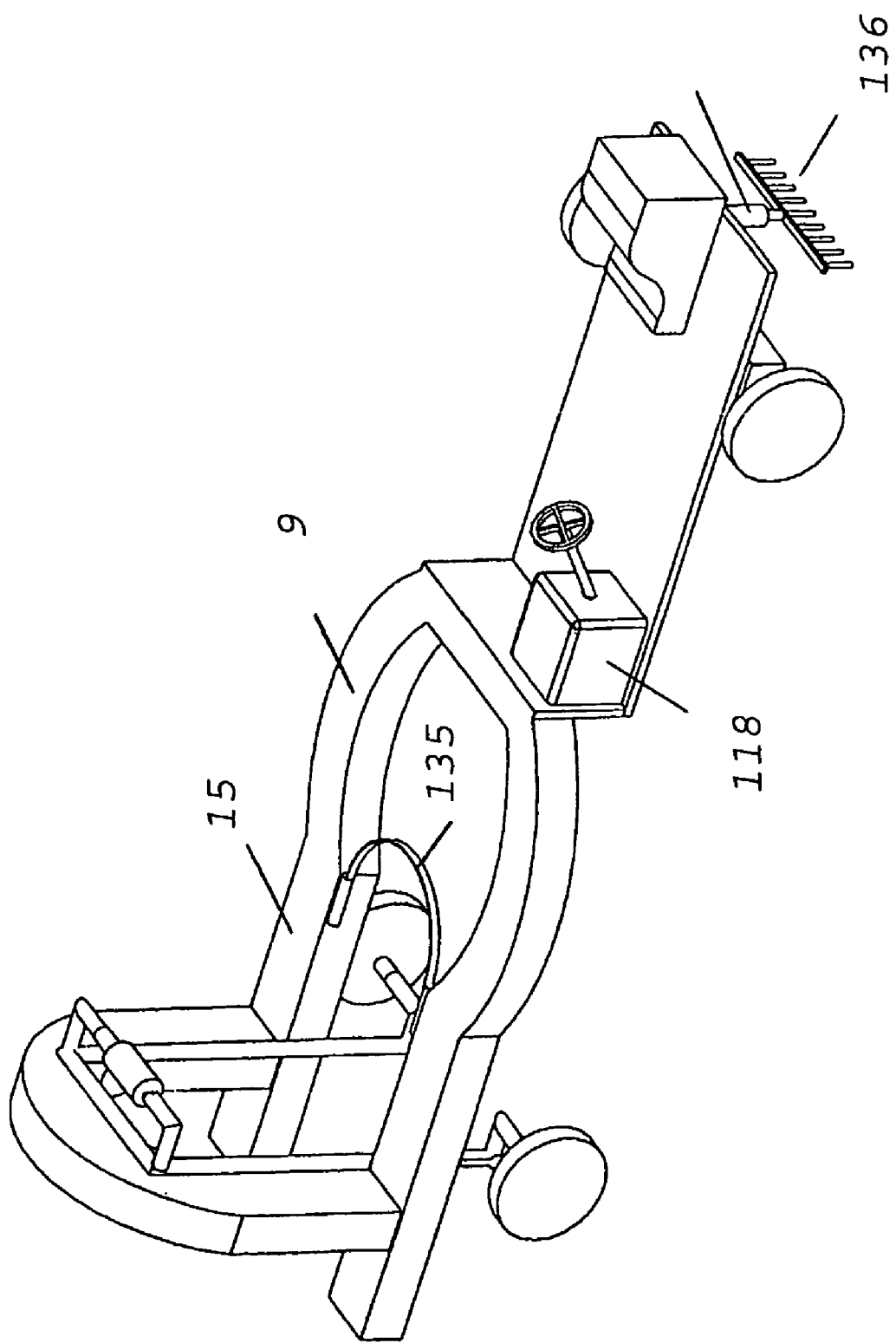
FIG. 17 is a perspective view of the confinement means in accordance with the present invention.

FIG. 17 illustrates the perspective view of the confinement means or barrier part in accordance with the present invention. In case the animal is frightened, the barrier part (135) prevents the animal to go inside the training device. The barrier part is secured to the lateral coverages through holder pieces (134) which are preferably hydraulic-based pistons.

The barrier part is in contact with the backside of the animal once introduced into the animal device. Since the barrier part is in contact with the animal directly, it is made of flexible material, and furthermore, in order to enhance the flexibility thereof, spring means can be attached thereto.

A harrow (136) is placed at the backside of the integrated animal training device for smoothing the ground as the training device moves on the ground. The harrow can be lifted up or down by a harrow piston (137).

Figure 18:
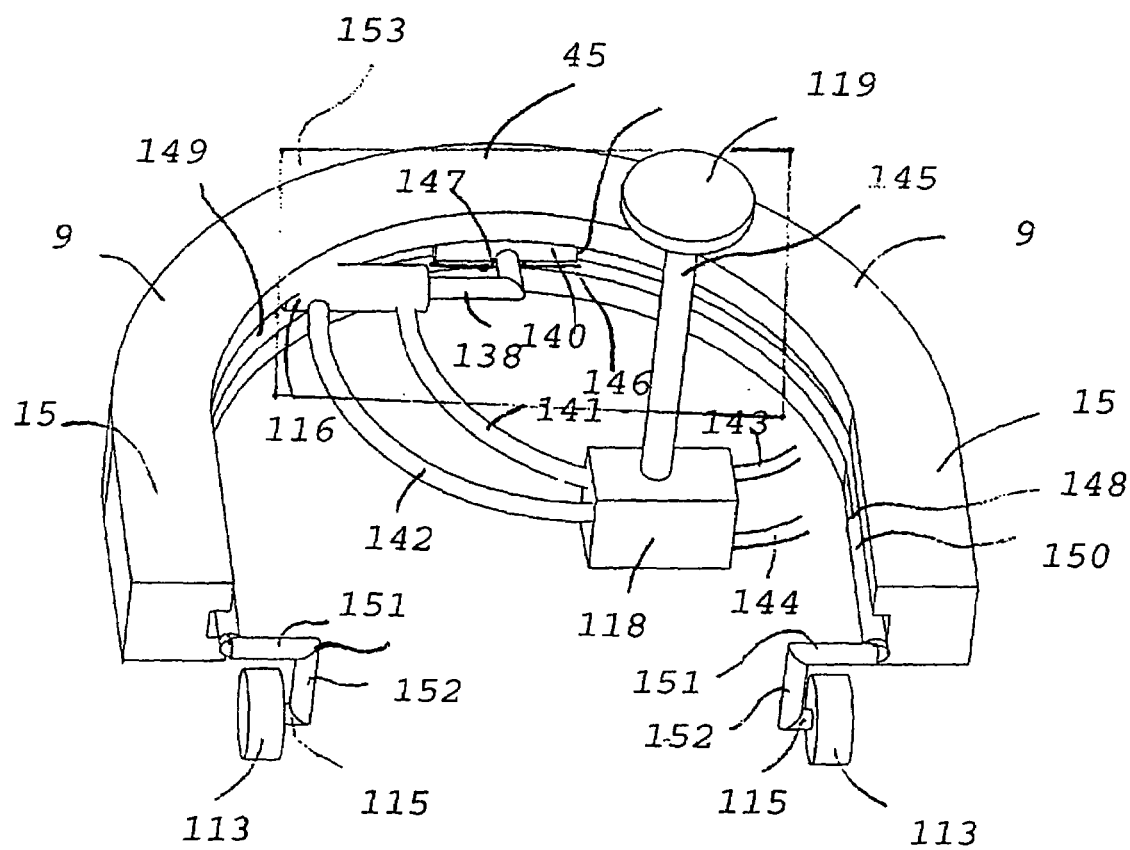
FIG. 18 is a perspective view of the alternative integrated animal training device in accordance with the present invention.

FIG. 18 illustrates the perspective view of the alternative integrated animal training device. According to the figure, as the steering wheel (119) is turned, the steering beam (145) connected to the steering wheel (119) from one end and connected to the valve (118) from other end, lock or unlock the channels in the valve (118) so that the hydraulic is directed in the desired direction. The valve comprises four openings, two of which are used to feed the hydraulic into the piston (116), ultimately providing direction change of the front wheels. The third opening is embodied for transmitting the hydraulic from hydraulic storage to the valve (118) by virtue of a feeding hydraulic line (143), and the fourth one is embodied for evacuating the excess hydraulic to the hydraulic storage by virtue of an evacuation hydraulic line (144).

As seen in the FIG. 18, the piston is fed with hydraulic from a right hydraulic line (141) and a left hydraulic line (142). Depending on the coming hydraulic, i.e., from right or left line, a piston arm (138) connected to the piston (116) is displaced in forward or backward directions. Since the piston arm (138) is rigidly attached to a directing beam (140), as the piston arm (138) is displaced accordingly the directing beam (140) is displaced in horizontal direction. For structural integrity, the directing beam (140) is supported by an outer housing (146), whereby the directing beam (140) is movable in the outer housing (146). Since the form of the directing beam (140) comprises a horizontal and a vertical component, i.e., "T" like shape, horizontal displacement extent of the directing beam (140) is determined by the vertical component movable through displacement opening (147) formed in the outer housing (146).

The directing beam (140) movable in the horizontal direction by actuation of the piston (116) is attached to a curved bar (149) by virtue of a middle connection (148). This curved bar (149) is disposed in the lateral coverages (15). Once the piston (116) actuates the directing beam (140), the curved bar (149) is moved and transfers its motion to a straight bar (150). Accordingly, the straight bar (150) transfers the motion to a connecting rod (151) further connected to a vertical beam (152) from the other end. Consequently, a direction arm (115) connected from one end to the vertical beam (152) and connected from other end to the front wheel (113) transfers the motion to the front wheel (113).

The above-mentioned components including piston (116), valve (118), directing beam (140), and outer housing (146) are covered by a protective lid (153) for preventing external effects.

Figure 19:
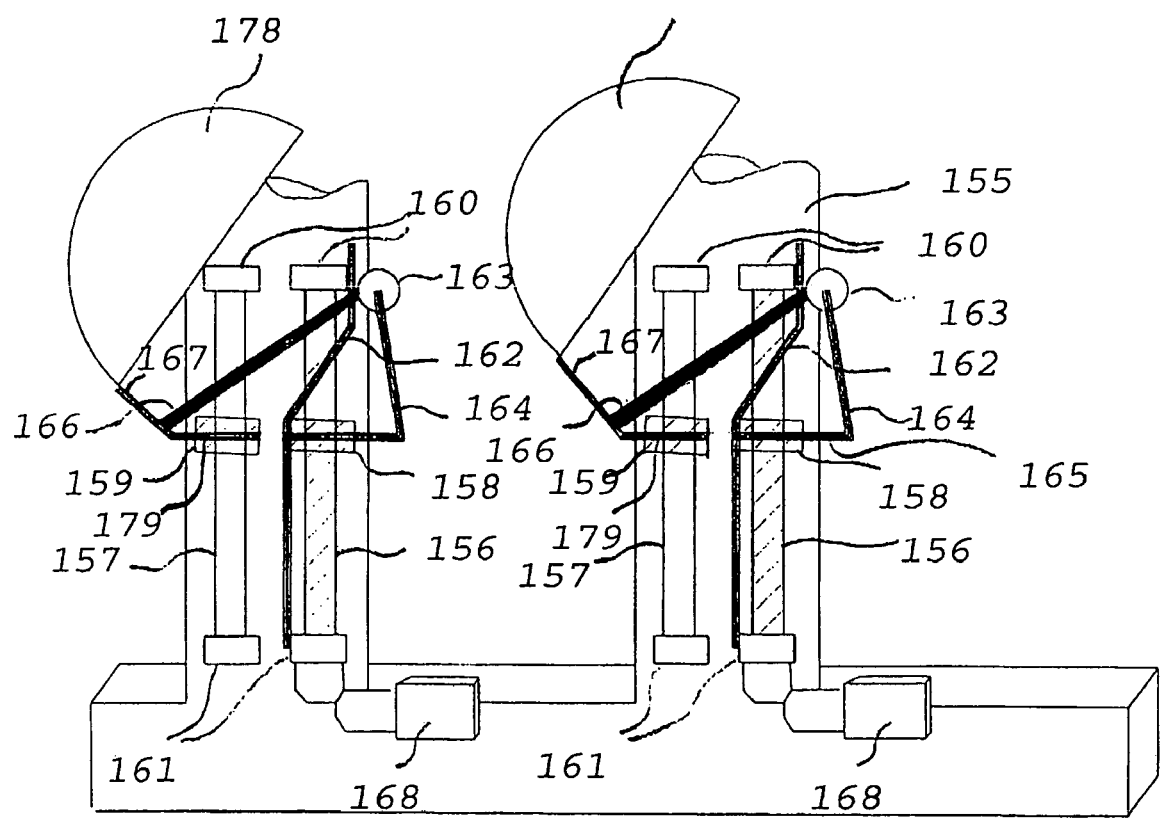
FIG. 19 illustrates the front and rear covering means in accordance with the present invention.

FIG. 19 illustrates the front and rear covering means in accordance with the present invention. Once the animal is placed in the training device, the front and rear regions of the animal are enclosed by means of covering means (178). The mechanism driving these covering means (178) is seen in the figure. Two pivots (156,157) are fixed vertically to the convex structure legs (155) through upper bearings (160) and lower bearings (161). One of the pivots, actuator pivot (156), is a screwed pivot and actuated by a motor (168) at the bottom side. The motor (168) is an electric-based motor, however it may be driven by energy provided from the self-powered motor.

An actuation ring (158) is annularly placed on the actuator pivot (156). As the actuator pivot (156) is rotated, the actuation ring (158) is displaced in upwards or downwards directions. Alongside the actuator pivot (156), a support pivot (157) is placed so that the gravity force of the covering means (178) is met by the support pivot (157). Similarly, a support ring (159) connected rigidly to the actuator ring (158) is annularly placed to the support pivot (157), and is capable of being displaced in upwards and downwards directions.

An actuator ring arm (165) is fixed from one end to the actuator ring and pined from the other end to a wheel arm (164). The wheel arm is further pined from the other end to the center of a wheel (163) moving on a follower (162) comprising an eccentric pivot combination. A support ring arm (166) is pined from one end to the center of the wheel (163) and connected from other end to a holder arm (167) that is pined to fixed arm (179) connected to support ring (159).

The covering means (178) is driven as described below:

Once the actuator pivot (156) is rotated by the motor (168), the actuation ring (158) is displaced in vertical direction. In the mean time, the wheel (163) associated with the actuation ring (158) is moving on the follower (162) comprising eccentric pivot combination. As the wheel (163) is moving on the lower pivot of the eccentric pivot combination, the support ring arm (166) shifts its position and the covering means (178) connected to the support ring arm (166) shifts its position accordingly. Once the actuation ring (158) displaces to a certain point, the covering means (178) completely covers the front side of the animal.

Similar covering movement applies to when the actuation ring (158) moves on the upper pivot of the eccentric pivot combination. Once the actuation ring (158) displaces to a certain point, the covering means (178) is completely lifted and the front side of the animal is opened.

In one embodiment of the present invention, the above mentioned covering means (178) mechanism is assembled alongside the other leg of the convex structures so that the rear side of the animal is closed or opened.

Air bags are provided in the covering means (178) so that the position of the animal can be controlled. These air bags can be inflated as desired to confine the position of the animal.

Figure 20:
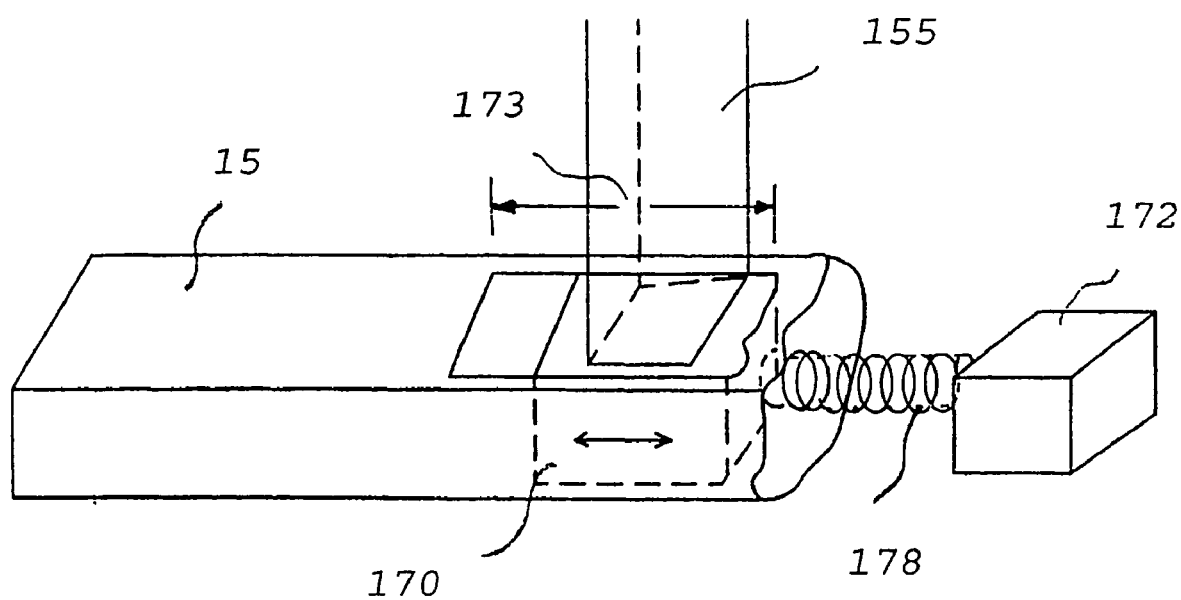
FIG. 20 illustrates the mechanism providing displacing of the convex structures with respect to the lateral coverages in accordance with the present invention.

FIG. 20 illustrates the mechanism providing displacing of the convex structures with respect to the lateral coverages in accordance with the present invention. As seen from the figure, convex structure legs (155) are capable of moving in the lateral coverages (15) through the displacement opening (173).

The convex structure legs (155) are connected to horizontal sledges (170) disposed in the lateral coverages (15).

The horizontal sledges (170) are driven by a sledge motor (172), and a sledge spring (178) is provided between the sledge motor (172) and the horizontal sledge (170). As the sledges (170) are driven by the sledge motor (172), the convex structure legs (155) connected to the sledges (170) move accordingly.

Figure 21:
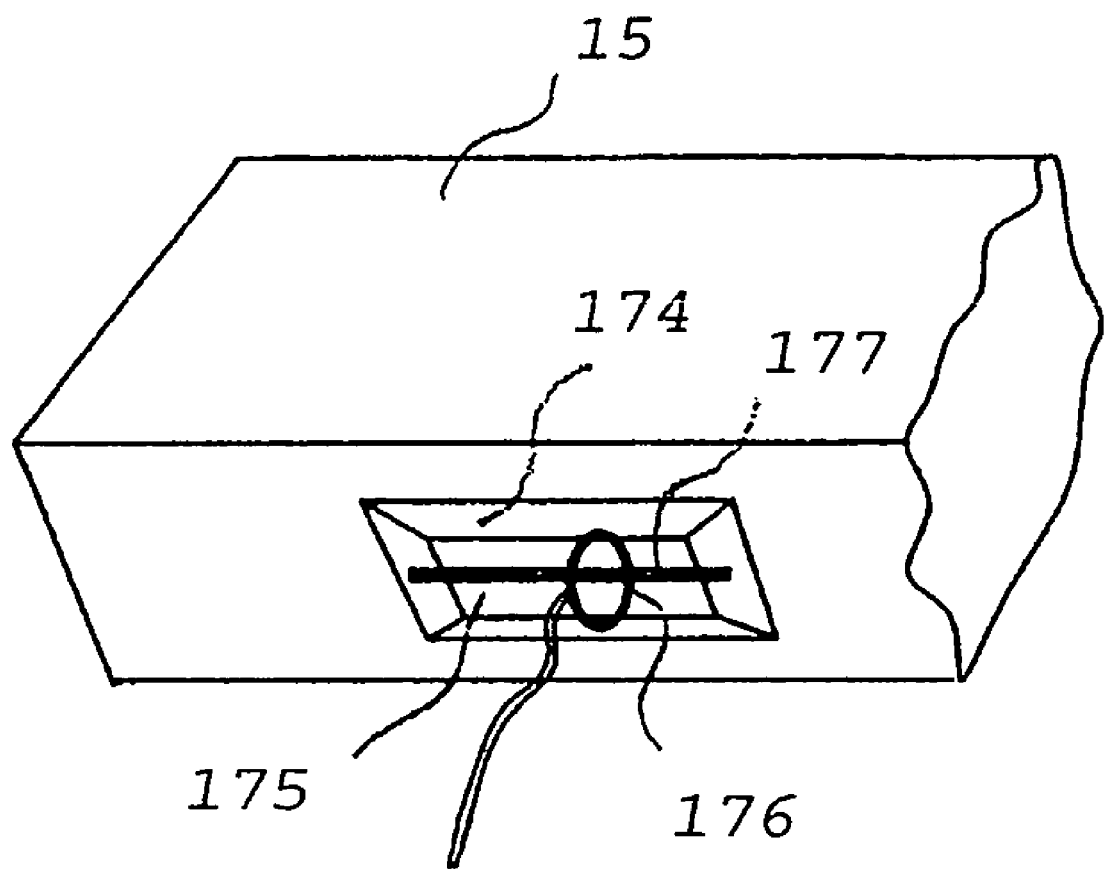
FIG. 21 illustrates the magnetic-based structure disposed in the lateral coverages in accordance with the present invention.

FIG. 21 illustrates the magnetic-based structure disposed in the lateral coverages in accordance with the present invention. Housings (174), in which electro-magnets (175) are disposed, are formed at inner sides of the lateral coverages (15). A rod (177) capable of moving in the housing (174) and holding a ring (176) is embodied in the housing (174). This ring (176) is connected to the saddle (16) on the animal. Adjustable magnetic force provided by the electromagnet renders the ring (176) to displace any desired amount in the housing (174).

What is claimed is:

1. An automated training system for an animal, comprising:
    an enclosure device for enclosing the animal to be trained, the enclosure device having at least two lateral elements and a rear element, the at least two lateral elements and the rear element being at least partially covered with a flexible material such that the flexible material surrounds the animal on sides and rear of the animal;
    a propulsion mechanism for moving the enclosure device;
    a connection arrangement for connecting the animal to the enclosure device;
    a convex structure extending over the top of the enclosure device and having legs connected to the at least two lateral elements of the enclosure device;
    a saddle connection arrangement, a first end of the saddle connection arrangement being connected to a saddle positioned on the animal and a second end of the saddle connection arrangement being connected to the convex structure, the saddle connection arrangement providing a capability for suspending the animal in case of necessity;
    a pre-training arrangement having a plurality of convex frames, a plurality of lateral guides, an upper guide positioned at the top region of the convex frames, and a plurality of guiding wheels positioned on the lateral guides and on the upper guide; and
    a laboratory attached to the enclosure device, the laboratory including at least one of a computer, an EKG device, a blood test analyzer and an endoscope.

2. The training system according to claim 1, wherein said connection arrangement includes a bit connection means connected to a bit at the mouth region of the animal, a bridle connection means connected to a bridle at the head region of the animal, a chest band connection means connected to a chest band at the chest region of the animal.

3. The training system according to claim 1, wherein a first end of said saddle connection arrangement is connected to the saddle by a ring and a second end is wrapped around at least one drum that is actuated by a motor, wherein the drum and the motor are positioned at the upper region of the convex structure, and wherein the motor is actuated by a signal from a sensor for sensing a mass of the animal.

4. The training system according to claim 1, wherein said saddle is made from one of silicon, plastic, and rubber material, and wherein said saddle is capable of supporting a mass up to approximately 70 kg.

5. The training system according to claim 3, wherein said saddle is moved one of upwards and downwards by the drum and the motor, and wherein a locking means is provided for adjusting the displacement of the saddle.

6. The training system according to claim 2, wherein a plurality of cordon means are disposed in the lateral elements and connected to said connection arrangement.

7. The training system according to claim 6, wherein three cordons are provided, including a bit cordon connected to the bit connection means, a bridle cordon connected to the bridle connection means, and a chest band cordon connected to the chest band connection means.

8. The training system according to claim 7, wherein a plurality of springs are connected between the enclosure device and the cordons.

9. The training system according to claim 8, wherein a bit spring is connected to the bit cordon, a bridle spring is connected to the bridle cordon, and a chest band spring is connected to the chest band cordon.

10. The training system according to claim 1, wherein a plurality of blockage parts are positioned in an area of a connection point of said convex structure and said lateral elements of the enclosure device, whereby legs of the animal in the enclosure device are prevented from extending outside the enclosure device.

11. The training system according to claim 1, wherein the lateral elements are connected to corresponding curved elements in the rear portion of the lateral elements, whereby back legs of the animal are prevented from being injured by accidental contact with the enclosure device.

12. The training system according to claim 1, wherein at least one movable locator is positioned at rear of the enclosure device, said movable locator being moved one of forward and backward by at least one moving mechanism.

13. The training system according to claim 1, wherein at least one movable locator is positioned at front of the enclosure device, said movable locator being moved one of forward and backward by at least one moving mechanism.

14. The training system according to claim 1, wherein said rear element includes two symmetric parts, and wherein said rear element is one of opened and closed by pivoting each of the symmetric parts around corresponding joints disposed in the lateral elements.

15. The training system according to claim 14, wherein at least one actuation means is connected between the rear element and the lateral elements.

16. The training system according to claim 15, wherein said actuation means is a cylinder-piston mechanism.

17. The training system according to claim 1, wherein a front blockage housing and a front blockage element are positioned in front of the enclosure device, the front blockage element being movable relative to the front blockage housing.

18. The training system according to claim 17, wherein at least one actuation means is provided for moving the front blockage element.

19. The training system according to claim 18, wherein said actuation means is a cylinder-piston mechanism.

20. The training system according to claim 1, wherein a plurality of air bags are disposed on the lateral elements.

21. The training system according to claim 20, wherein the air bags are connected to openings located on the lateral elements.

22. The training system according to claim 21, wherein a compressor is provided for inflating the air bags, and wherein a connection pipe for transmitting air from the compressor to the lateral elements is provided, and wherein an air intake opening is provided on at least one of the lateral elements.

23. The training system according to claim 1, wherein the convex frames of the pre-training arrangement each include an upper frame element and a bottom frame element.

24. The training system according to claim 1, wherein a plurality of legs are provided for fixing the lateral elements to the ground.

25. The training system according to claim 1, wherein at least one wheel is provided on the upper guide of the pre-training arrangement, and wherein at least one motor is provided for moving the wheel.

26. The training system according to claim 25, wherein at least two plates are connected to the wheel and to the animal, and wherein rigid plate holders are connected to the plates.

27. The training system according to claim 25, wherein a saddle connection means is connected between the wheel and the saddle on the animal.

28. The training system according to claim 1, wherein a bit connection means is connected between a bit at the mouth region of the animal and wheels movable in the lateral elements, and wherein a bridle connection means is connected between a bridle at the head region of the animal and wheels movable in the lateral elements.

29. The training system according to claim 26, wherein said bit connection means is connected between the bit and the plates, and wherein the bridle connection means is connected between the bridle and the plates.

30. The training system according to claim 26, wherein the motor is operationally connected to the plates and to the lateral guides by a plurality of wheels that are moved by the motor.

31. The training system according to claim 1, wherein, for pulling of the pre-training arrangement, a single pulling motor and an associated wheel are connected to the pre-training arrangement by a rigid connection means.

32. The training system according claim 1, wherein a plurality of mobile platforms are provided for attachment to the enclosure arrangement, and wherein each platform has a plurality of teeth on the bottom side, and wherein at least one actuator gear wheel is connected to a motor for moving the mobile platforms.

33. The training system according to claim 32, wherein the plurality of mobile platforms are concatenated.

34. The training system according to claim 32, wherein the mobile platforms have a U shape, and wherein grooves are formed on inner surface of the U shape for accommodating wheels.

35. The training system according to claim 34, wherein plurality of holders are fixed to the ground for holding the wheels accommodated in the mobile platforms.

36. The training system according to claim 32, wherein a column is provided on the mobile platforms, and wherein a pin is disposed on the upper region of the column, the pin connecting the column to a wheel.

37. The training system according to claim 36, wherein chains are provided for connecting the plurality of mobile platforms to each other.

38. The training system according to claim 37, wherein the training system is actuated by a motor operationally connected to wheels guided on the lateral elements.

39. The training system according to claim 38, wherein the motor is operationally further connected to a pulling wheel.

40. The training system according to claim 1, wherein the training system is actuated by a motor operationally connected to wheels guided on an upper region of the enclosure device.

41. The training system according to claim 40, wherein the motor is operationally further connected to pulling wheel.

42. The training system according to claim 1, wherein a lid is provided at the front region of the enclosure device for introducing the animal into the enclosure device, the lid having an opening for allowing extension of the head of the animal out of the enclosure device.

43. The training system according to claim 1, wherein at least one of the following is provided: a thermometer is provided on the animal; at least one respiration meter is positioned near the nose region of the animal; at least one needle is provided for taking blood sample; and at least one tub is provided for accumulating blood sample taken from the animal.

44. The training system according to claim 1, wherein at least one camera is provided at one of the rear element and the lateral elements of the enclosure device.

45. The training system according to claim 1, wherein a plurality of convex structures are provided extending over the top of the enclosure device, and wherein a plurality of side sliding means are provided between said convex structures, and wherein actuation means are positioned on side sliding means for one of stretching and loosening of the connection arrangement.

46. The training system according to claim 45, wherein an electronic control unit is provided for controlling extent of displacement of the actuation means positioned on the side sliding means.

47. The training system according to claim 46, wherein data of animal training distance are input into said electronic control unit for controlling displacement of the actuation means to effect said stretching and loosening of the connection arrangement.

48. The training system according to claim 45, wherein a saddle bear fixed to a middle sliding means between the side sliding means is provided, and wherein an upper spherical joint is disposed in the saddle bear, and wherein a fixed cylinder is connected to the upper spherical joint, and wherein a movable cylinder is positioned in the fixed cylinder.

49. The training system according to claim 48, wherein at least one spring element is positioned in the fixed cylinder along the longitudinal axis, and wherein a lower spherical joint is positioned between the movable cylinder and the saddle.

50. The training system according to claim 49, wherein an obstruction part having a U shape for restricting the movement of said upper spherical joint is disposed in the saddle bear.

51. The training system according to claim 1, wherein an axial actuation means, a vertical actuation means, and a horizontal actuation means are provided for displacing the lateral elements along at least one of three perpendicular space directions.

52. The training system according to claim 51, wherein said axial, vertical and horizontal actuation means are hydraulic-based cylinder-piston mechanisms.

53. The training system according to claim 1, wherein said lateral elements each have at least one outer coverage and an inner coverage penetrating into the outer coverage, and wherein a spring element is placed between the outer and inner coverages.

54. The training system according to claim 53, wherein a housing is provided for the outer coverage, and wherein a slipway is provided for the inner coverage, and wherein said slipway is adapted to be one of introduced into and withdrawn from the housing.

55. The training system according to claim 53, wherein said spring element is connected between an outer leg fixed to the outer coverage and an inner leg, and wherein a middle spring is positioned between the outer and inner legs.

56. The training system according to claim 1, wherein said enclosure device having said lateral elements and the rear element is connected by an intermediary part to a rear unit having a self-powered motor, a steering wheel, a steering pivot, a valve attached to the steering pivot, and rear wheels, and wherein front wheels for the enclosure device are provided, said front wheels being actuated by hydraulic provided from the self powered motor.

57. The training system according to claim 56, wherein a pipe is provided for transmitting the hydraulic from the self powered motor to the valve and furthermore transmitting the hydraulic to one of a primary hydraulic line and a secondary hydraulic line from the valve.

58. The training system according to claim 57, wherein a piston having a plurality of chambers is provided, the piston being connected to a piston actuating pivot, and wherein the hydraulic is transmitted from one of the primary hydraulic line and the secondary hydraulic line through the piston.

59. The training system according to claim 58, wherein a plurality of upper connecting rods connected to the piston are provided.

60. The training system according to claim 59, wherein a plurality of rotary pivots connected to the connecting rods are provided, said rotary pivots being oriented along the vertical direction.

61. The training system according to claim 60, wherein at least one beam connected to the connecting rods and to the rotary pivots is provided, said beam being oriented substantially parallel to the piston actuating pivot.

62. The training system according to claim 60, wherein a plurality of lower connecting rods connected to the rotary pivots are provided.

63. The training system according to claim 62, wherein a plurality of direction arms connected between the lower connection rods and the front wheels are provided.

64. The training system according to claim 57, wherein the primary hydraulic line and the secondary hydraulic line are disposed in the lateral elements of the enclosure device.

65. The training system according to claim 56, wherein a harrow means is provided at the rear region of the rear unit, and wherein the harrow means is adapted to be displaced at least one of up and down through a harrow piston.

66. The training system according to claim 1, wherein a front barrier part is attached to the lateral elements for preventing the animal from inadvertently entering the enclosure device.

67. The training system according to claim 66, wherein said barrier part is attached to the lateral elements by holder pieces that are hydraulic piston mechanisms.

* * * * *